United States Patent
McFarland et al.

(10) Patent No.: US 10,458,448 B2
(45) Date of Patent: Oct. 29, 2019

(54) SURFACE AFFIX-ABLE DEVICE INCORPORATING MECHANICALLY ACTUATED DRY ADHESIVE

(71) Applicant: THE CHARLES STARK DRAPER LABORATORY, INC., Cambridge, MA (US)

(72) Inventors: William Whitcomb McFarland, Waltham, MA (US); David J. Carter, Concord, MA (US); Nicolas A. Macias, Boston, MA (US); Graham Philip Arrick, Cambridge, MA (US); Jesse M. Carr, Cambridge, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 0 days.

(21) Appl. No.: 15/954,877

(22) Filed: Apr. 17, 2018

(65) Prior Publication Data
US 2018/0298928 A1    Oct. 18, 2018

Related U.S. Application Data

(60) Provisional application No. 62/486,547, filed on Apr. 18, 2017.

(51) Int. Cl.
*A47G 1/17*    (2006.01)
*F16B 2/00*    (2006.01)
(Continued)

(52) U.S. Cl.
CPC .............. *F16B 2/005* (2013.01); *A45C 11/00* (2013.01); *A45C 2011/002* (2013.01); *F16B 11/006* (2013.01)

(58) Field of Classification Search
CPC ....... B25J 15/0085; F16B 2/005; A45C 11/00; C09J 11/04; C09J 201/00
See application file for complete search history.

(56) References Cited

U.S. PATENT DOCUMENTS

| 3,607,590 A | * | 9/1971 | Califano | ............. | E04F 13/0885 |
| | | | | | 428/40.3 |
| 5,326,523 A | | 7/1994 | Gustavel et al. | | |

(Continued)

FOREIGN PATENT DOCUMENTS

| EP | 2444226 A2 | 4/2012 |
| WO | 2007095214 A2 | 8/2007 |

(Continued)

OTHER PUBLICATIONS

Hoon Eui Jeong et al: "A Nontransferring Dry Adhesive with Hierarchical Polymer Nanohairs", Proceedings of the National Academy of Sciences of the United States of America, Apr. 7, 2009, pp. 5639-5644, XP055253908, United States, DOI: 10.1073/pnas.0900323106.

(Continued)

*Primary Examiner* — Amy J. Sterling
(74) *Attorney, Agent, or Firm* — Lando & Anastasi, LLP

(57) ABSTRACT

A surface affixable device incorporating mechanically actuated dry adhesive includes a body and a plurality of tiles affixed to the body. Each of the plurality of tiles includes an array of dry adhesive material elements disposed on front faces thereof. A first of the plurality of tiles is movably affixed to the body. An actuator is constructed and arranged to displace the first of the plurality of tiles in a first direction relative to a second of the plurality of tiles. A biasing element applies a bias to the first of the plurality of tiles in a second direction upon displacement of the first of the plurality of tiles in the first direction.

23 Claims, 34 Drawing Sheets

(51) Int. Cl.
*A45C 11/00* (2006.01)
*F16B 11/00* (2006.01)

(56) References Cited

U.S. PATENT DOCUMENTS

| | | |
|---|---|---|
| 2006/0110845 A1 | 5/2006 | Guo et al. |
| 2006/0282936 A1 | 12/2006 | Olson et al. |
| 2007/0231541 A1 | 10/2007 | Humpal et al. |
| 2009/0022941 A1* | 1/2009 | Fischer .................. A61B 5/00 |
| | | 428/116 |
| 2012/0295068 A1 | 11/2012 | Cutkosky et al. |
| 2014/0272272 A1 | 9/2014 | Spenko et al. |
| 2018/0264657 A1* | 9/2018 | Dadkhah Tehrani ..... B81C 1/00 |

FOREIGN PATENT DOCUMENTS

| | | |
|---|---|---|
| WO | 2010025515 A1 | 3/2010 |
| WO | 2010096072 A1 | 8/2010 |
| WO | 2010138132 A1 | 12/2010 |
| WO | 2011063332 A2 | 5/2011 |
| WO | 2012166053 A1 | 12/2012 |
| WO | 2016094557 A1 | 6/2016 |
| WO | 2016137555 A2 | 9/2016 |

OTHER PUBLICATIONS

Yue Wang et al: "Fabrication of Well-Defined Mushroom-Shaped Structures for Biomimetic Dry Adhesive by Conventional Photolithography and Molding", ACS Applied Materials and Interfaces, vol. 6., No. 4, Feb. 26, 2014 (Feb. 26, 2014), pp. 2213-2218, XP055253754, US ISSN: 1944-8244, DOI: 10.1021/am4052393.

* cited by examiner

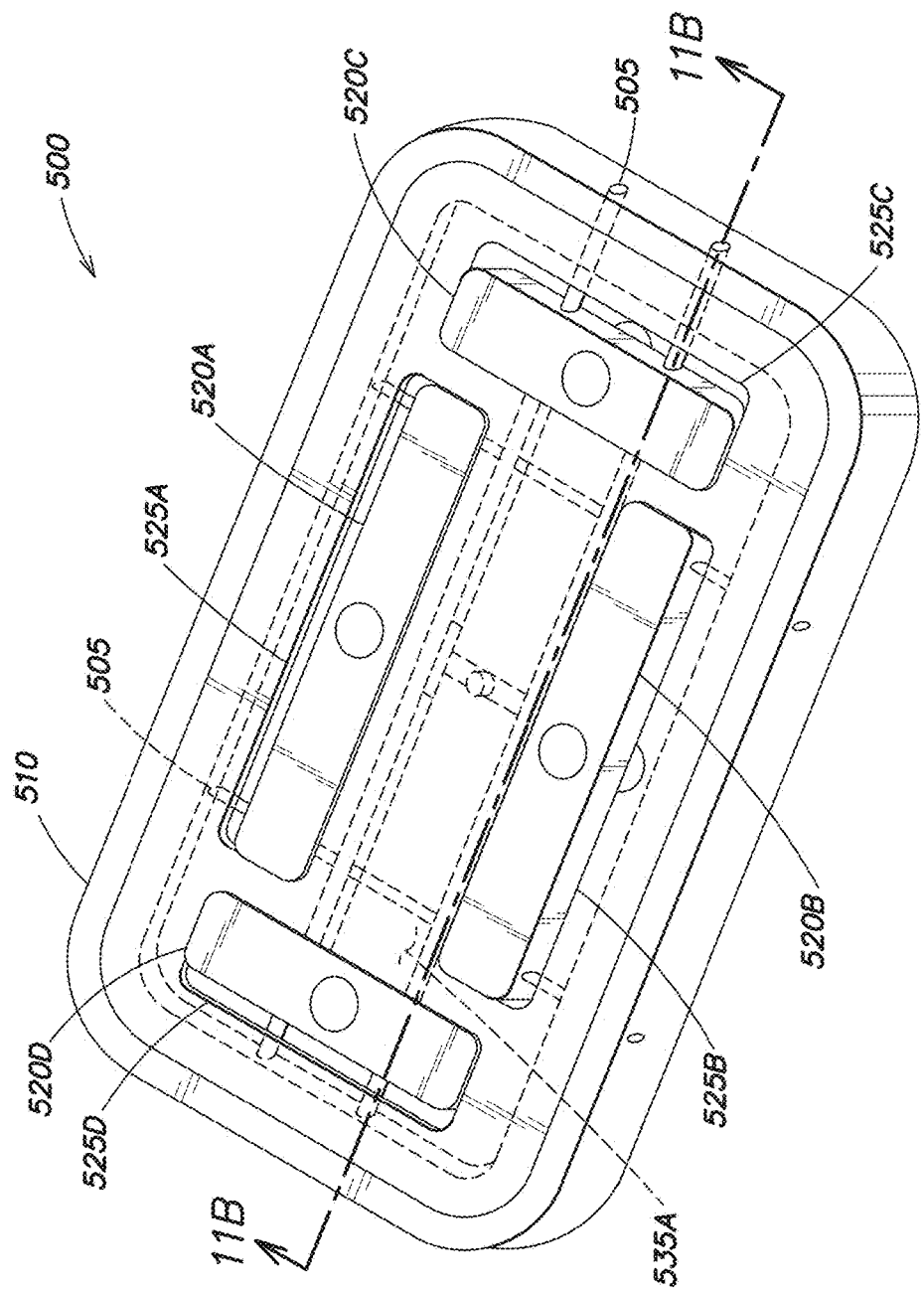

SURFACE AFFIX-ABLE DEVICE INCORPORATING MECHANICALLY ACTUATED DRY ADHESIVE

CROSS-REFERENCE TO RELATED APPLICATIONS

This application claims priority under 35 U.S.C. § 119(e) to U.S. Provisional Patent Application Ser. No. 62/486,547, titled "SURFACE AFFIX-ABLE DEVICE INCORPORATING MECHANICALLY ACTUATED DRY ADHESIVE," filed Apr. 18, 2017, which is herein incorporated by reference in its entirety for all purposes.

FIELD OF INVENTION

Aspects and embodiments disclosed herein are generally directed to devices incorporating synthetic dry adhesive microstructures configured to removably adhere an object to a surface.

SUMMARY

In accordance with a first aspect, there is provided a surface affixable device incorporating mechanically actuated dry adhesive. The device comprises a body and a plurality of tiles affixed to the body. Each of the plurality of tiles including an array of dry adhesive material elements disposed on front faces thereof. A first of the plurality of tiles is movably affixed to the body. The device further includes an actuator constructed and arranged to displace the first of the plurality of tiles in a first direction relative to a second of the plurality of tiles, and a biasing element that, upon displacement of the first of the plurality of tiles in the first direction, applies a bias to the first of the plurality of tiles in a second direction. The second direction is opposite the first direction.

In some embodiments, the plurality of tiles are co-planar. The front faces of the plurality of tiles may define a movement plane, the first direction being in the movement plane, and the second direction being in the movement plane. The actuator may be co-planar with the plurality of tiles. The actuator may be constructed and arranged to displace the first of the plurality of tiles out of a plane defined by the front faces of the plurality of tiles.

In some embodiments, the bias displaces the first of the plurality of tiles relative to the second of the plurality of tiles, displacement of the first of the plurality of tiles relative to the second of the plurality of tiles generating an adhesive force between the plurality of tiles and a surface in contact with the front faces of the plurality of tiles.

In some embodiments, each array of dry adhesive material elements includes mechanically actuated directional dry adhesive elements. The actuator may be constructed and arranged to displace the first of the plurality of tiles in a tilt direction of the mechanically actuated directional dry adhesive elements.

In some embodiments, each array of dry adhesive material elements includes an array of microwedges.

In some embodiments, the actuator slides into and out of the body between the first of the plurality of tiles and the second of the plurality of tiles.

In some embodiments, the biasing element is a leaf spring.

In some embodiments, the biasing element includes an elastomeric material.

In some embodiments, each of the plurality of tiles further includes a rear face adhesively coupled to a base, the base being coupled to the body. The base may include a compliant material layer. The array of dry adhesive material elements of each of the plurality of tiles may be defined in a sheet, at least a portion of a periphery of the sheet extending beyond a periphery of the compliant material layer. The sheet may be adhesively coupled to the base at least partially about the periphery of the compliant material layer.

In some embodiments, the second of the plurality of tiles is fixed in place on the body.

In some embodiments, the body includes a recess configured to receive and retain a consumer electronic device.

In accordance with another aspect, there is provided a surface affixable device incorporating mechanically actuated dry adhesive. The device comprises a body and a plurality of co-planar tiles affixed to the body. Each of the plurality of co-planar tiles includes an array of dry adhesive material elements disposed on faces thereof. The faces of the plurality of co-planar tiles define a movement plane. A first of the plurality of co-planar tiles is movably affixed to the body. A second of the plurality of co-planar tiles is fixed in place on the body. The device further includes an actuator constructed and arranged to displace the one of the plurality of co-planar tiles in a first direction in the movement plane relative to a second of the plurality of co-planar tiles, displacement of the one of the plurality of co-planar tiles relative to the second of the plurality of co-planar tiles generating an adhesive force between the plurality of co-planar tiles and a surface in contact with the faces of the plurality of co-planar tiles.

In accordance with another aspect, there is provided a surface affixable device incorporating mechanically actuated dry adhesive. The device comprises a body and a plurality of tiles affixed to the body. Each of the plurality of tiles includes an array of dry adhesive material elements disposed on faces thereof. A first of the plurality of tiles is movably affixed to the body. The device further includes a biasing element that, upon displacement of a first of the plurality of tiles in a first direction relative to a second of the plurality of tiles, applies a bias to the first of the plurality of tiles in a second direction, the second direction being opposite the first direction.

In some embodiments, the plurality of tiles is a plurality of co-planar tiles, and the first direction is a rotational direction in a plane defined by the faces of the plurality of co-planar tiles.

In accordance with another aspect, there is provided a surface affixable device incorporating mechanically actuated dry adhesive. The device comprises a body and a plurality of tiles affixed to the body. Each of the plurality of tiles includes an array of dry adhesive material elements disposed on front faces thereof. At least one of the plurality of tiles is movably affixed to the body. The device further includes an actuator constructed and arranged to apply a first force on the at least one of the plurality of tiles in a first direction relative to a second of the plurality of tiles, and a biasing element that, upon displacement of the at least one of the plurality of tiles in the first direction, applies a bias to the at least one of the plurality of tiles in a second direction, the second direction being opposite the first direction.

In some embodiments, the plurality of tiles are disposed in a common plane.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 11A illustrates an inner mechanism of another embodiment of a cell phone case fitted with tiles including dry adhesive microwedge arrays;

DETAILED DESCRIPTION

Figure 1A:
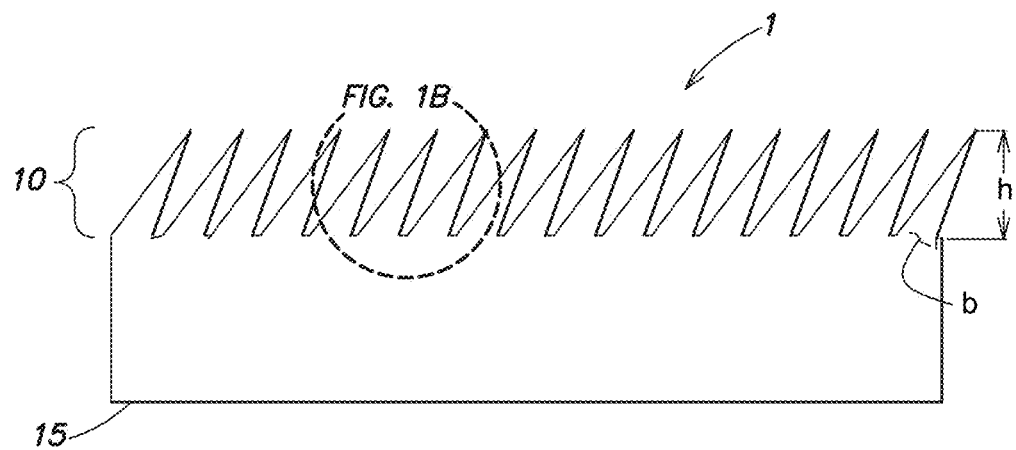
FIG. 1A is an enlarged schematic elevational view of a portion of an embodiment of a micro-scale dry adhesive structure including a pattern of microelements.

Aspects and embodiments disclosed herein are not limited in application to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Aspects and embodiments disclosed herein include a device incorporating a mechanically actuated element including dry adhesive material that enables the device to be temporarily affixed to a variety of surfaces in any orientation. In some examples, the device includes directionally biased dry adhesive material which provides friction/adhesion and concurrent normal adhesion forces in response to a contact shear load applied in a particular orientation within the plane of its surface. In some examples, the device includes a mechanism which generates relative force between two or more co-planar swatches or tiles including directional dry adhesive material which may also include micro-scale geometric bias. The inter-tile force generated by the mechanism is applied in a direction congruent with the material bias orientation, giving rise to sufficient normal force to adhere the device to the desired surface.

Micro-Scale Dry Adhesive Structures

Figure 1B:
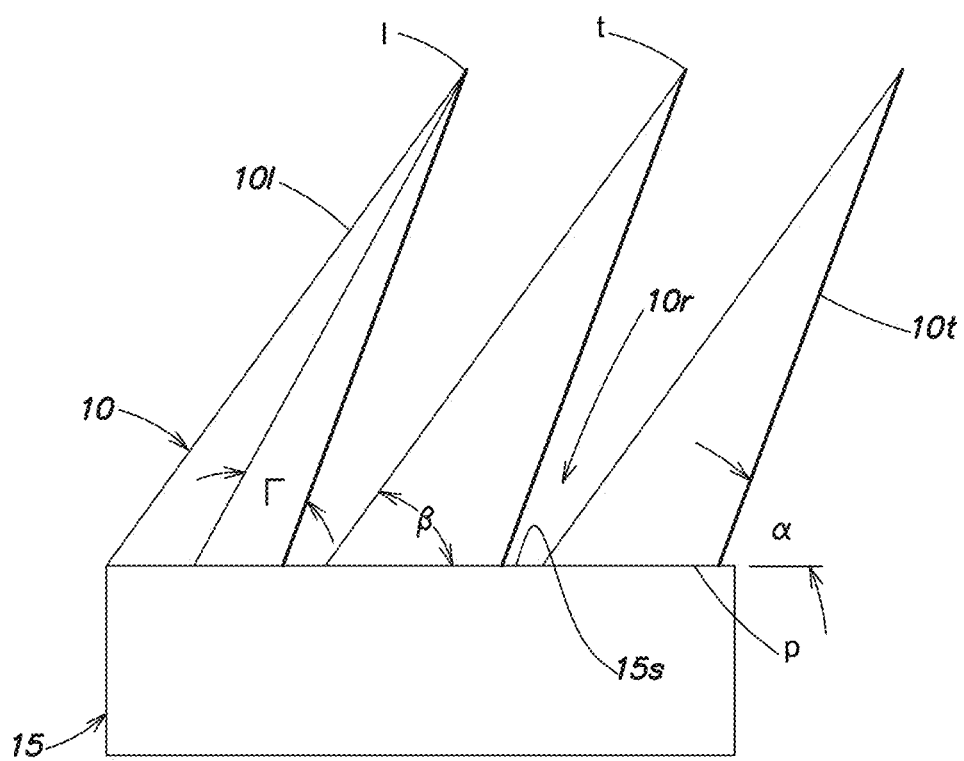
FIG. 1B is an enlarged schematic elevational view of an embodiment of microwedges that may be used in the micro-scale dry adhesive structure of FIG. 1A.

International patent applications PCT/US2015/064795 and PCT/US2015/064791, which are incorporated herein in their entireties for all purposes, describe synthetic "dry adhesive" structures (the term dry adhesive comprising both adhesive and/or friction enhancing structures) and methods and apparatus for making same. The adhesive and/or friction enhancing structures disclosed in these applications may include micro-scale elements, for example, elements having characteristic dimensions of less than about 100 μm, and are thus referred to as micro-scale dry adhesive structures. An example of an embodiment of a micro-scale dry adhesive structure including a pattern of micro-elements is illustrated in FIG. 1A. The micro-scale dry adhesive structure 1 includes a plurality of micro-elements, microwedges 10, disposed on a backing 15. The microwedges 10 may have heights h of about between about 80 μm and about 120 μm and bases b with widths of between about 20 μm and about 40 μm, and length of between about 120 μm and about 160 μm. As illustrated in FIG. 1B, the microwedges may include leading edges 101 angled at an angle β of between about 20 degrees and about 65 degrees from a line or plane p defined by an upper surface 15s of the backing 15 or the bases of the microwedges. The microwedges may include trailing edges 10t angled at an angle α of between about 35 degrees and about 85 degrees from line or plane p. The microwedges may include centerlines 1 that bisect the microwedges and that are angled at an angle Γ of between about 30 degrees and about 70 degrees from line or plane p.

The microwedges 10 may have asymmetric tapers about their center lines 1. Tips t of the microwedges 10 may extend over the leading edges 101 of adjacent microwedges 10 and adjacent microwedges may define re-entrant spaces 10r defined below a trailing edge 10t of a first microwedge and above a leading edge 101 of a second microwedge 10 adjacent the first microwedge 10. These dimensions and angular ranges are examples, and aspects and embodiments disclosed herein are not limited to microwedge structures having these particular dimensions or angles.

Embodiments of the micro-scale dry adhesive structures may be formed from a polymer, for example, polydimethylsiloxane (PDMS), another silicone, polyurethane, or another polymeric material. Specific examples of polyurethanes that embodiments of the adhesive structures may be formed include M-3160 A/B polyurethane and L-3560 A/B polyurethane, available from BJB Enterprises. In some embodiments, the material from which embodiments of the micro-scale dry adhesive structures disclosed herein may be formed exhibit a Shore A hardness of between about 40 and about 60.

Figure 2A:
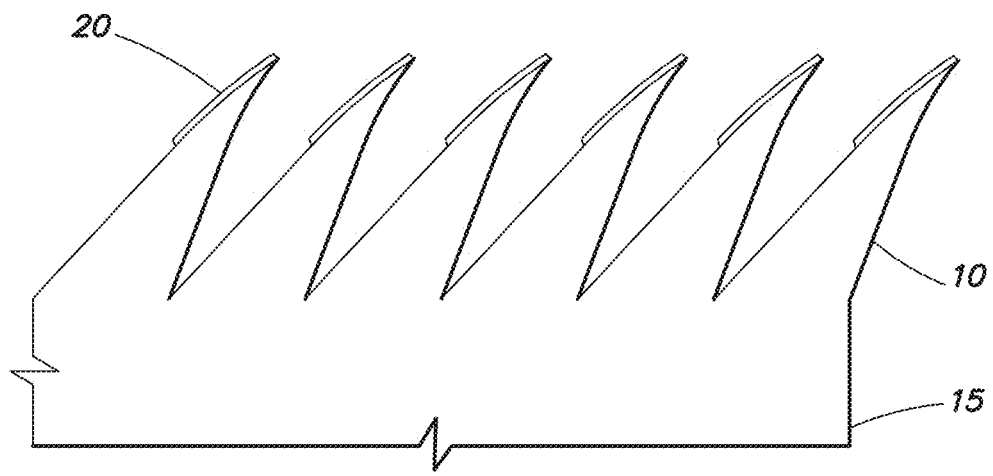
FIG. 2A is an enlarged schematic elevational view of an embodiment of microelements that may be used in the micro-scale dry adhesive structure of FIG. 1A.
Figure 2B:
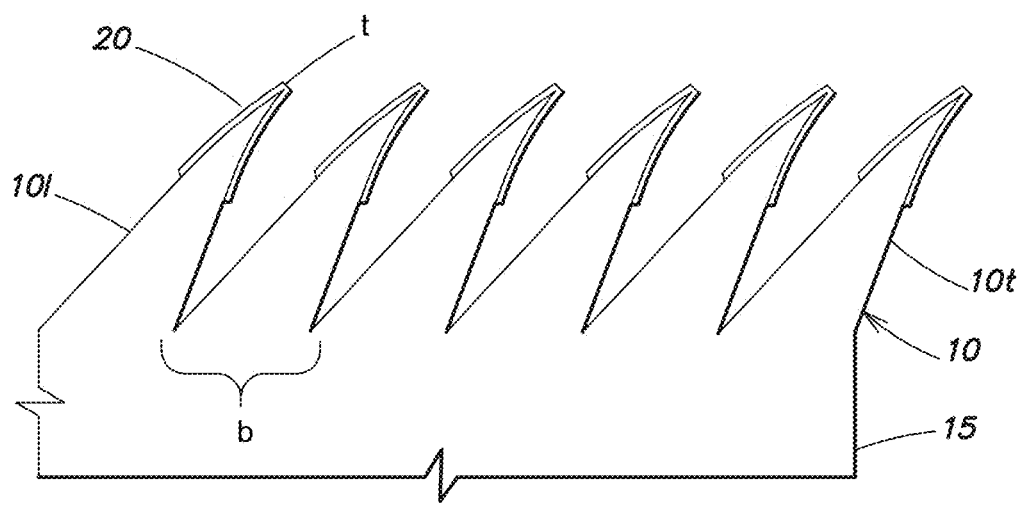
FIG. 2B is an enlarged schematic elevational view of another embodiment of microelements that may be used in the micro-scale dry adhesive structure of FIG. 1A.
Figure 3:
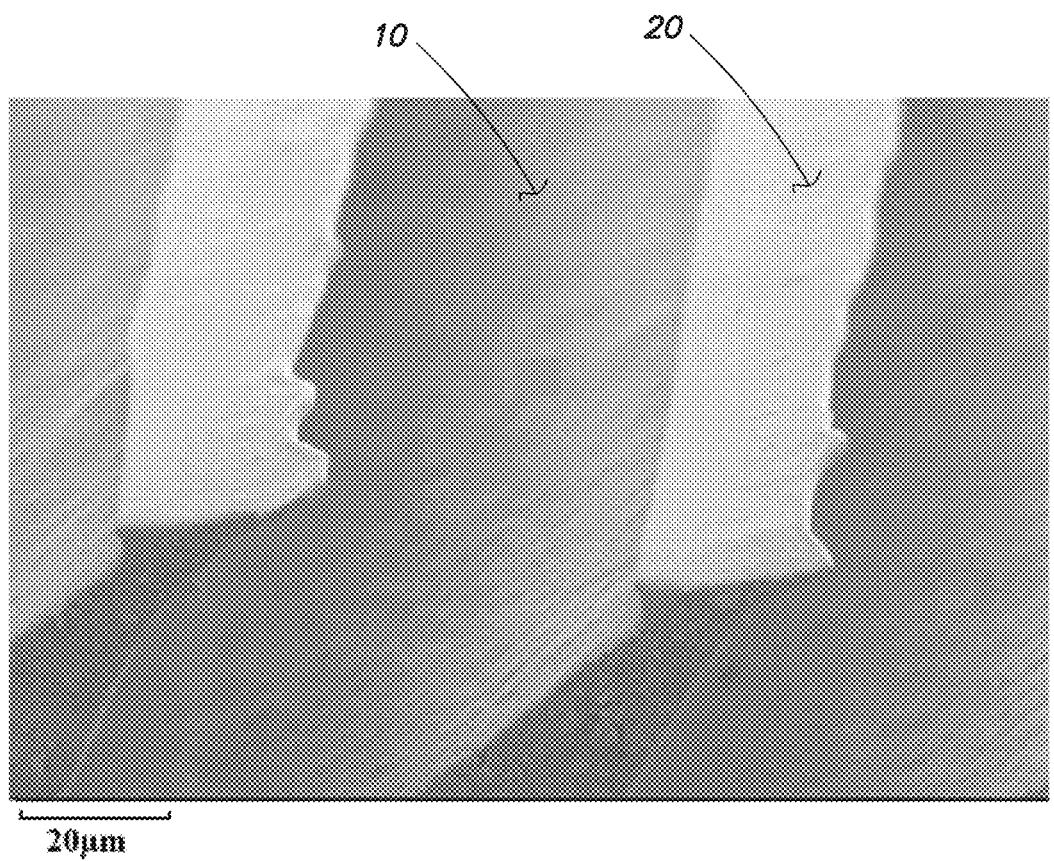
FIG. 3 illustrates a lip formed on an end of a micro-wedge of an embodiment of a micro-scale dry adhesive structure.

In some embodiments, the microwedges 10 of the micro-scale dry adhesive structure 1 may include an extra layer of cured material on the tips of the microwedges forming an adhesion and/or friction enhancing layer 20 (hereinafter "enhancement layer 20"), as illustrated in FIG. 2A, FIG. 2B and in the micrograph of FIG. 3. In some embodiments, the enhancement layers 20 have smoother surfaces than the microwedges 10 and may be added to the microwedges to increase the smoothness of portions of the microwedges proximate tips t of the microwedges 10. The enhancement layers 20 may be formed of an elastomeric material. The enhancement layers 20 may be formed from the same material as the remainder of the microwedges 10, but in some embodiments, may be formed of a different material that that of the remainder of the microwedges 10. The enhancement layers 20 may have smooth surfaces, as illustrated in FIG. 2A, FIG. 2B, and FIG. 3, but in other embodiments, may be patterned, for example, with ridges, columns, or other patterns. In some embodiments, the enhancement layers 20 may be present on only portions of a leading edges 101 of the microwedges 10, or in other embodiments may be present on both trailing edges 10t and leading edges 101 of the microwedges 10. (FIG. 2B.) The enhancement layers 20 may terminate at lips at the intersection of the enhancement layers 20 and the microwedges 10, for example, at the step illustrated in FIG. 3 at the bottom of enhancement layer 20 as it transitions to microwedge 10.

In some embodiments, the bases b of individual microwedges 10 may be spaced from one another, as illustrated in FIG. 1A, for example, by between about 0 μm and about 30 μm, and in other embodiments, for example, as illustrated in FIG. 2B, the leading edge 101 of a first microwedge may intersect a trailing edge 10t of a second microwedge 10 adjacent to the first microwedge 10 at bases b of the microwedges 10.

Figure 4:
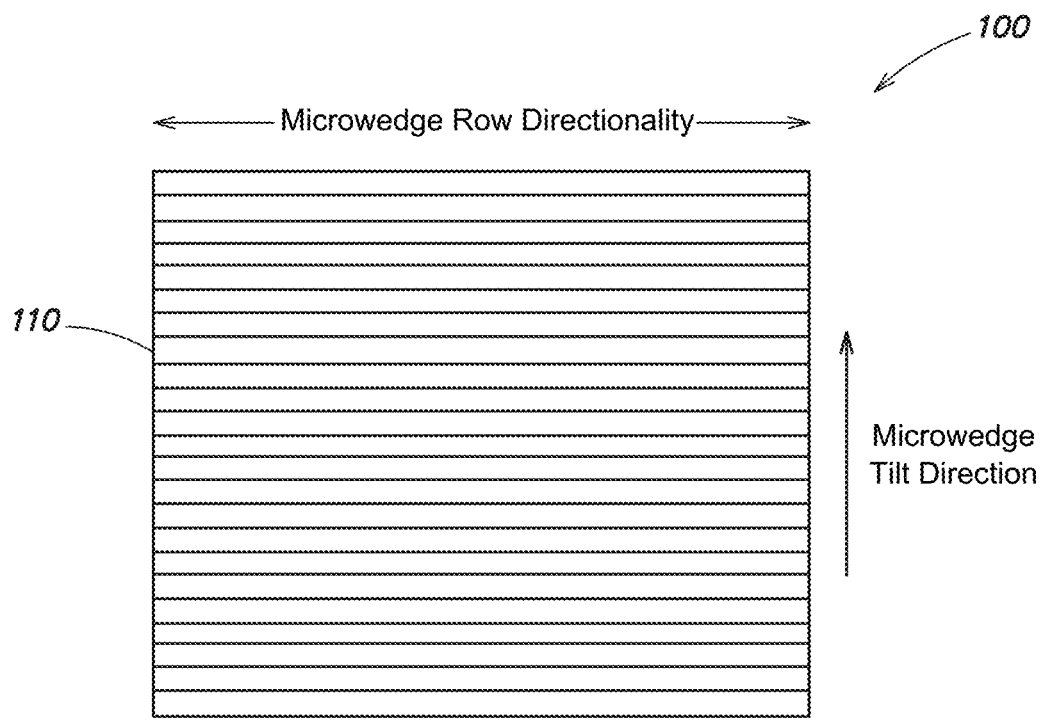
FIG. 4 illustrates the orientation of microwedges in an embodiment of a microwedge array.
Figure 5:
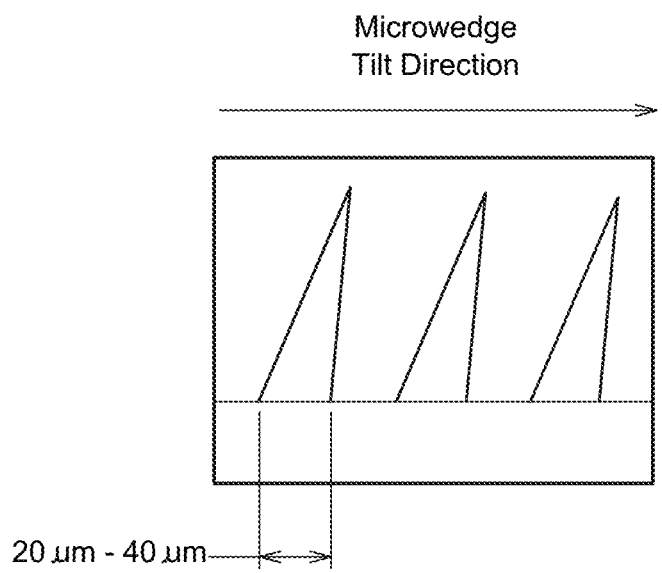
FIG. 5 illustrates what is considered the tilt direction of an embodiment of a group of microwedges.

In some embodiments, the micro-scale dry adhesive structure may be mounted on a rigid base substrate, for example, a substrate including layers of carbon fibers and plywood, to provide the micro-scale dry adhesive structure with enhanced mechanical stiffness and/or to maintain the microwedges 10 in a substantially same plane. The micro-scale dry adhesive structure mounted on a rigid base substrate may form an adhesive swatch or tile 100. The microwedges may extend across an entirety, or substantially an entirety of the base substrate 105, for example as illustrated in FIG. 4 with the direction of bias or tilt as defined in FIG. 5 illustrated by the single headed arrow in FIG. 4. As shown the direction of tilt or "tilt direction" as defined herein is in a direction from the leading edges to the trailing edges of the microwedges.

In some embodiments, the micro-scale dry adhesive structure may be both directional and biased. It may be directional in that the wedge row orientations supply the transverse direction for micro-deformation of the wedge tips in bending. It may be biased in that the geometry is tailored so that the contact surface presented by a bent wedge tip differs depending on the choice of direction in which the transverse tip bending load is applied.

Figure 6A:
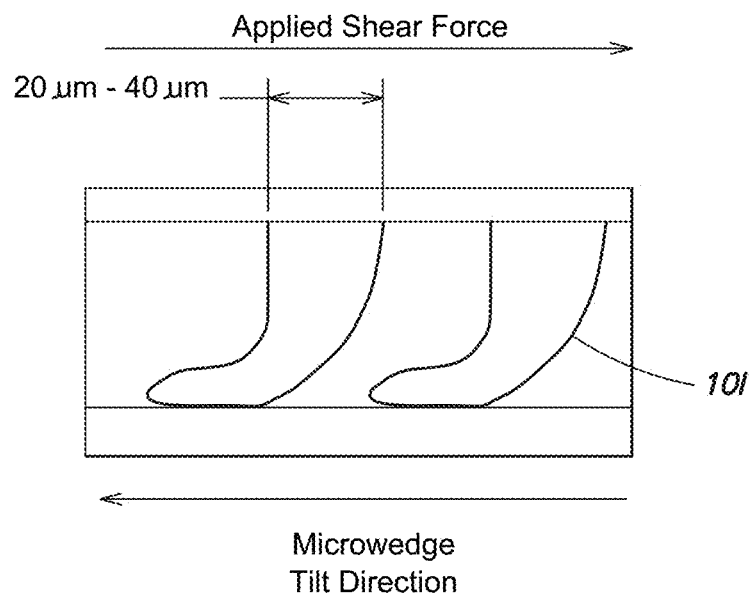
FIGS. 6A and 6B illustrate deformation of embodiments of microwedges under an applied shear force.
Figure 6B:
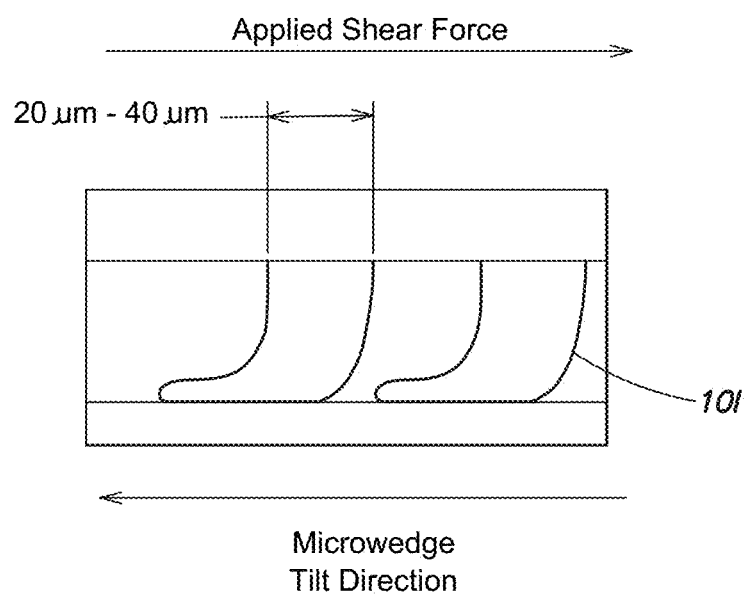

In use, to adhere embodiments of the micro-scale dry adhesive structure to a surface, the micro-scale dry adhesive structure is placed against the surface and a shear force is applied to the micro-scale dry adhesive structure in a direction opposite the direction of tilt of the microwedges. The microwedges are dragged across the surface and deform such that portions of the leading edges 101 of the microwedges come into contact with the surface as shown in FIGS. 6A and 6B. The material preferentially provides higher friction/adhesion in response to applied shear when placed in contact with a surface substrate in one orientation, i.e., the orientation in which the shear force is opposite in direction to the tilt direction of the microwedges, versus the opposing orientation. Weak intermolecular van der Waals forces arise between the microwedge material and the surface at the point of contact, providing a normal-oriented attraction between the micro-scale dry adhesive structure and the surface. The strength of the normal force depends on the magnitude of the applied shear load, with the peak occurring in a contact stress range dependent on the material properties and microwedge geometry. The mechanical concepts are also applicable when using dry adhesive material which is directional and capable of supplying similar force responses, but lacks bias (e.g. isosceles micro-wedges that have no tilt).

Surface Affixable Devices Including Dry Adhesive Structures

Figure 7A:
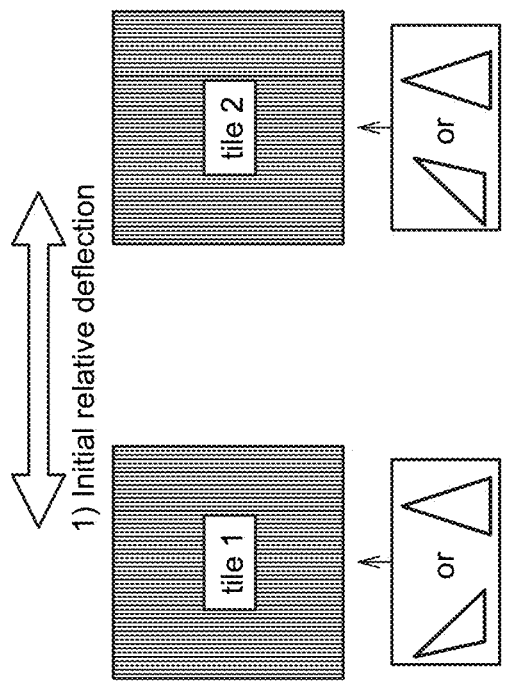
FIG. 7A illustrates relative deflection of two dry adhesive microwedge arrays in an embodiment of a method of securing an object including two dry adhesive microwedge arrays to a surface.
Figure 7B:
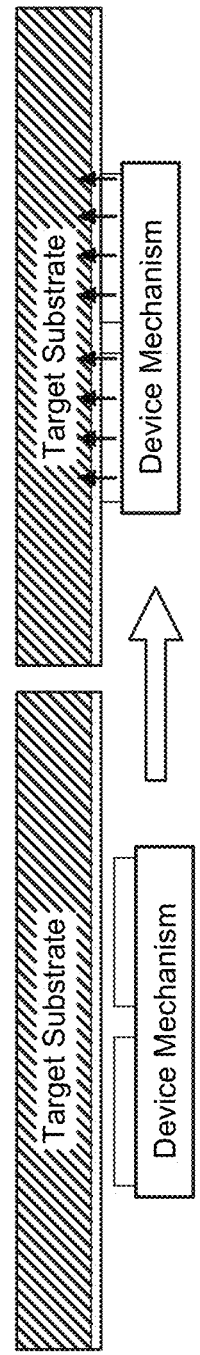
FIG. 7B illustrates applying an object to a surface in an embodiment of a method of securing an object including two dry adhesive microwedge arrays to a surface.
Figure 7C:
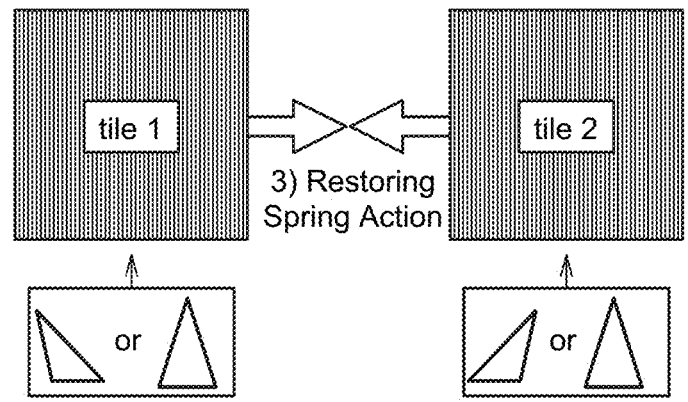
FIG. 7C illustrates relative deflection of two dry adhesive microwedge arrays in an embodiment of a method of securing an object including two dry adhesive microwedge arrays to a surface.
Figure 7D:
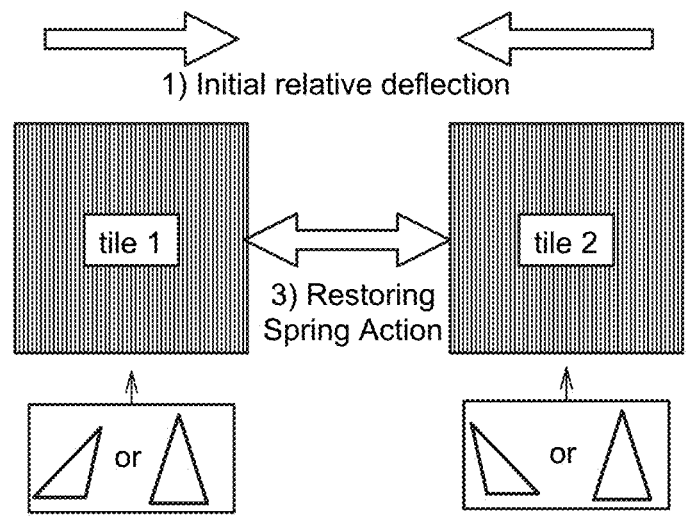
FIG. 7D illustrates an alternative direction of relative deflection of two dry adhesive microwedge arrays in another embodiment of another method of securing an object including two dry adhesive microwedge arrays to a surface.

Aspects and embodiments of surface affixable devices disclosed herein include two or more coplanar swatches or tiles of directional dry adhesive material and rely on relative displacement between the two or more coplanar swatches or tiles of directional dry adhesive material to provide an adhesive force to a surface. In some embodiments, the adhesion action included three steps, illustrated with reference to FIGS. 7A-7C. A first step includes an initial relative deflection of the adhesive tiles along a path transverse to the local directional orientation of the material and aligned with the tilt direction or bias orientation (if bias is present), storing energy in a restoring biasing element. (FIG. 7A.) A second step includes application of normal contact pressure between the adhesive and target substrate while the initial relative deflection is maintained. (FIG. 7B.) A third step includes release of stored energy from the biasing element while contact pressure is maintained, allowing the restoring spring force to supply contact shear loading between the adhesive and substrate. (FIG. 7C). If the direction of tilt of the microwedges is opposite from that illustrated in FIGS. 7A-7C, the direction of deflection in the first and third steps may be reversed, as illustrated in FIG. 7D. As illustrated in FIGS. 7A-7D, if the microwedges are untilted (e.g., isosceles triangle-shaped microwedges), the deflection provided in the first step may be in either direction normal to the lengthwise extent of the microwedges and the deflection provided in the third step may be opposite to that applied in the first step. In some embodiments, only the second and third steps may be performed to adhere a device including the tiles of dry adhesive material to a surface.

The adhesive force between the directional dry adhesive material and a surface may be enhanced for smooth surfaces, for example, glass or metal surfaces as opposed to rougher surfaces, for example, wood or concrete. In some embodiments, the directional dry adhesive material is mounted on a compliant material layer on a surface affixable device to provide greater conformance to a surface that is not completely flat.

The tiles of directional dry adhesive material disclosed herein may be included in surface affixable devices configured and arranged to removably affix any of a number of objects to one or more types of surfaces. A non-limiting list of objects that may be affixed to surfaces with surface affixable devices as disclosed herein (or that may include surface affixable devices as disclosed herein) includes cellular telephones (cell phones) or cases for same, tablet computers, media players, portable speakers, other consumer electronic devices, toothbrushes or other toiletries, cup holder, flashlights, and tools. Specific embodiments are illustrated below that are configured to removably affix a cell phone (e.g., Apple iPhone® or Samsung Galaxy® cell phone or the like) to a surface, but it is to be understood that the concepts illustrated in these embodiments may be applied to surface affixable devices configured to removably affix any of a number of alternate objects to various surfaces.

Figure 8A:
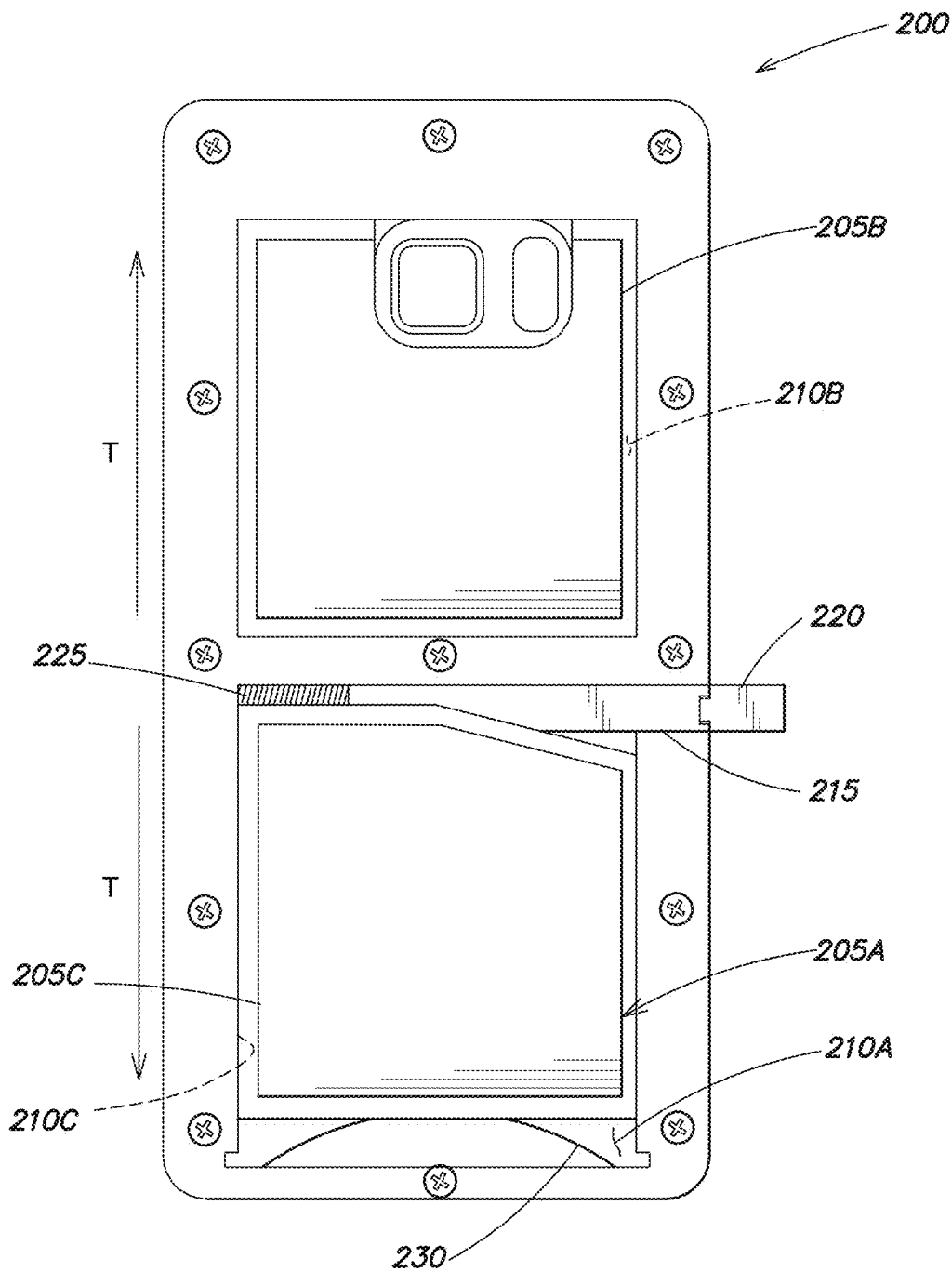
FIG. 8A illustrates an embodiment of a cell phone case fitted with a pair of tiles including dry adhesive microwedge arrays.
Figure 8B:
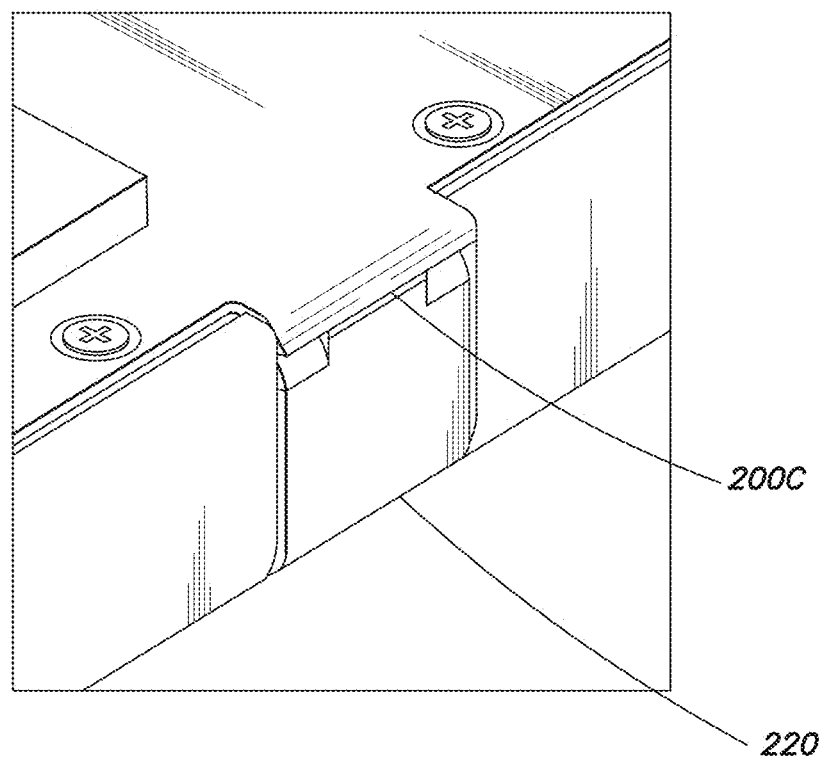
FIG. 8B is an enlarged view of a portion of the cell phone case of FIG. 8A.

A first embodiment of a surface affixable device incorporated into a case of a cell phone is illustrated in FIGS. 8A and 8B. The cell phone case 200 includes two co-planar tiles 205A, 205B of directional dry adhesive material mounted on a rear surface thereof. The directional dry adhesive material is mounted on front faces of the tiles 205A, 205B and includes arrays of microwedges, the microwedges extending across the widths of the tiles 205A, 205B. The microwedges have tilt directions T as indicated by the arrows labelled "T" in FIG. 8A. The tile 205A is movable relative to the body of the cell phone case 200 and the tile 205B. Edges 205C of the tile 205A may be disposed in slots formed in walls 210C of the lower cavity 210A of the cell phone case 200 to enable the tile 205A to move back and forth within the lower cavity 210A in a direction parallel to the tilt direction of the microwedges in the tile 205A. In other embodiments, different mechanisms known to those of skill in the art may be utilized to slidably mount the tile 205A in the cavity 210A, for example, by mounting the tile 205A on rails in the cavity 210A. The tile 205B is fixed in place in cavity 210B.

Figure 8C:
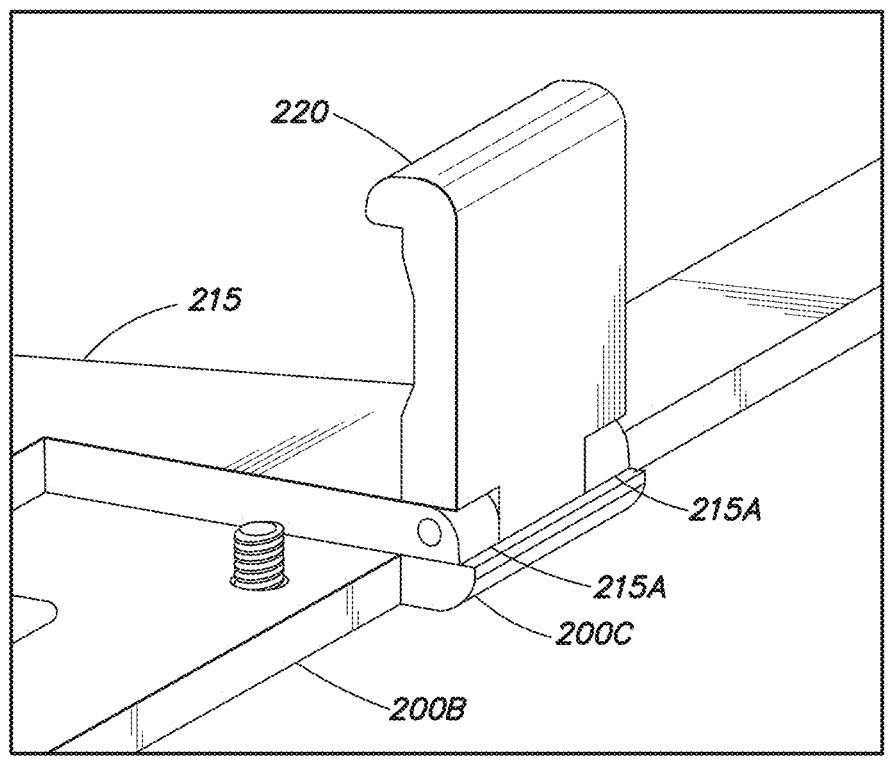
FIG. 8C is an enlarged view of a portion of the cell phone case of FIG. 8A with a retainer/lever piece in a closed position.
Figure 8D:
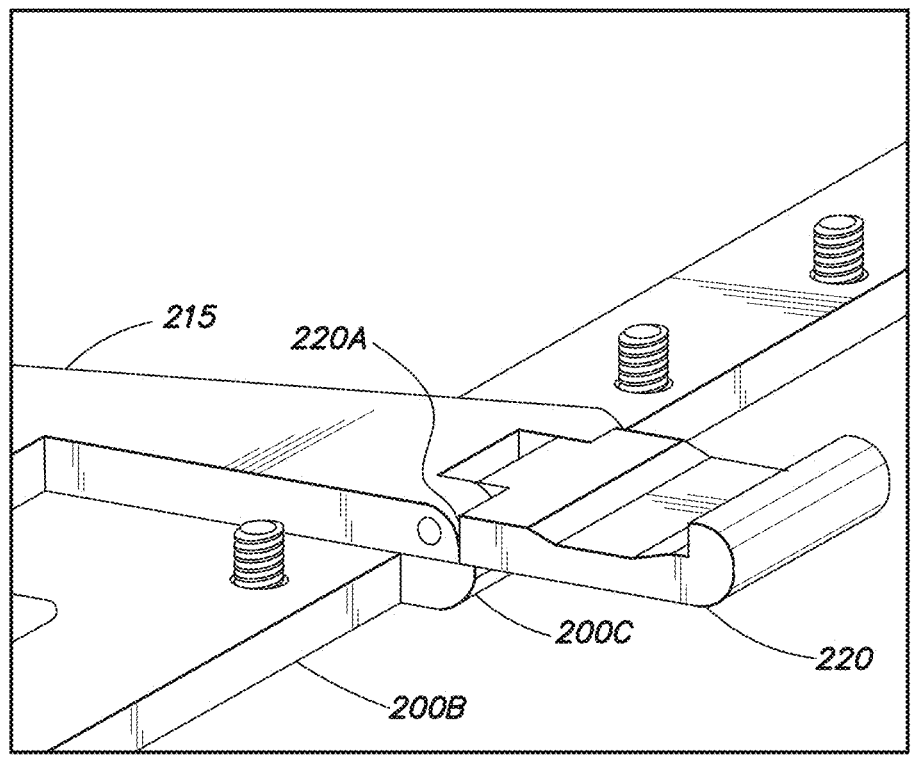
FIG. 8D is an enlarged view of a portion of the cell phone case of FIG. 8A with the retainer/lever piece in an open position.

The cell phone case 200 further includes an actuator in the form of wedge piece 215. Wedge piece 215 is movable into and out of the body of the cell phone case 200 and is biased out of the cell phone case 200 by a wedge piece biasing element, in this embodiment, wedge spring 225. When disposed in the body of the cell phone case, wedge piece 215 is disposed between and co-planar with tiles 205A, 205B. When not in use, wedge piece 215 may be retained within the body of the cell phone case 200 by retainer/lever piece 220, which is reversibly displaceable between an open and closed position. The open position of retainer/lever piece 220 is illustrated in FIG. 8A, and the closed position of retainer/lever piece 220 is illustrated in FIG. 8B. The retainer/lever piece 220 may snap in place in the closed position until acted upon to move it into the open position. When the retainer/lever piece 220 is opened the wedge spring 225 biases the wedge piece 215 out of the body of the cell phone case 200. To adhere the cell phone case 200 to a surface, a user flips open and pushes on the retainer/lever piece 220 which in turn transfers force to the wedge piece 215 to move the wedge piece 215 into the body of the phone case 200. An enlarged view illustrating the interaction between the retainer/lever piece 220 and the wedge piece 215 is illustrated in FIGS. 8C and 8D. As illustrated, the backing panel 200B of the phone case 200 includes a tab 200C that extends out toward the edge of the phone case 200 so that the retainer/lever piece 220 can't "flip" in the wrong direction toward the tile face of the phone case 200. The retainer/lever piece 220 and wedge piece 215 also incorporate detent interference features, for example flat surfaces 215A, 220A so that while the user is pushing on the retainer/lever piece 220 it doesn't accidentally fold toward the phone side of the phone case 200.

Movement of the wedge piece 215 into the body of the cell phone case 200 pushes the tile 205A downward through the cavity 210A in the direction of the tilt direction of the microwedges on the face of tile 205A, and compresses a tile biasing element, in this embodiment, leaf spring 230 on the opposite side of tile 205A from the wedge piece 215. This movement provides initial relative displacement between tiles 205A and 205B. Leaf spring 230 may be co-planar with tile elements 205A, 205B and wedge piece 215.

The tiles 205A, 205B of the cell phone case 200 are then placed in contact with a surface to which a user desires to adhere the phone case, and the user releases the force that was used to move the wedge piece 215 into the body of the phone case 200. When the force applied to the wedge piece 215 is released, wedge spring 225 pushes the wedge piece 215 outward from the body of the phone case 200 and the leaf spring 230 pushes the tile 205A upward through the cavity 210A in the direction opposite to the tilt direction of the microwedges on the face of tile 205A. The microwedges on the face of the tile 205A deform as illustrated in FIG. 6A or 6B and adhere to the surface to which they are applied.

Friction caused by adhesion of the microwedges on the face of the tile 205A to the surface to which they are applied, along with continued force applied to the tile 205A may cause the body on the phone case 200 as a whole to be displaced downward on the surface, causing the microwedges on the face of the tile 205B to be displaced in a direction opposite to their tilt direction such that they also deform as illustrated in FIG. 6A or 6B and adhere to the surface to which they are applied. The user may then release the phone case 200 and the phone case remains adhered to the surface by the adhesion forces supplied by the microwedges in tiles 205A and 205B.

The phone case 200 may be removed from the surface by pressing the wedge piece 215 into the body of the cell phone case 200 to cause the tiles 205A, 205B to move in the tilt direction of their respective microwedges, causing the deformation of the microwedges to be undone and the adhesion forces generated by the microwedges to be canceled. Alternatively the user may pull the phone case 200 from the wall with a force that exceeds the adhesion force produced by the microwedges on the faces of the tiles 205A, 205B.

It should be appreciated that a rear cover (not shown) may be provided on the rear of the phone case 200 to cover the wedge piece 215 and wedge spring 225 while allowing the tiles 205A, 205B to contact a surface to which the cell phone case 200 is to be adhered. The rear cover may also retain the movable tile 205A within the body of the cell phone case 200.

Figure 9A:
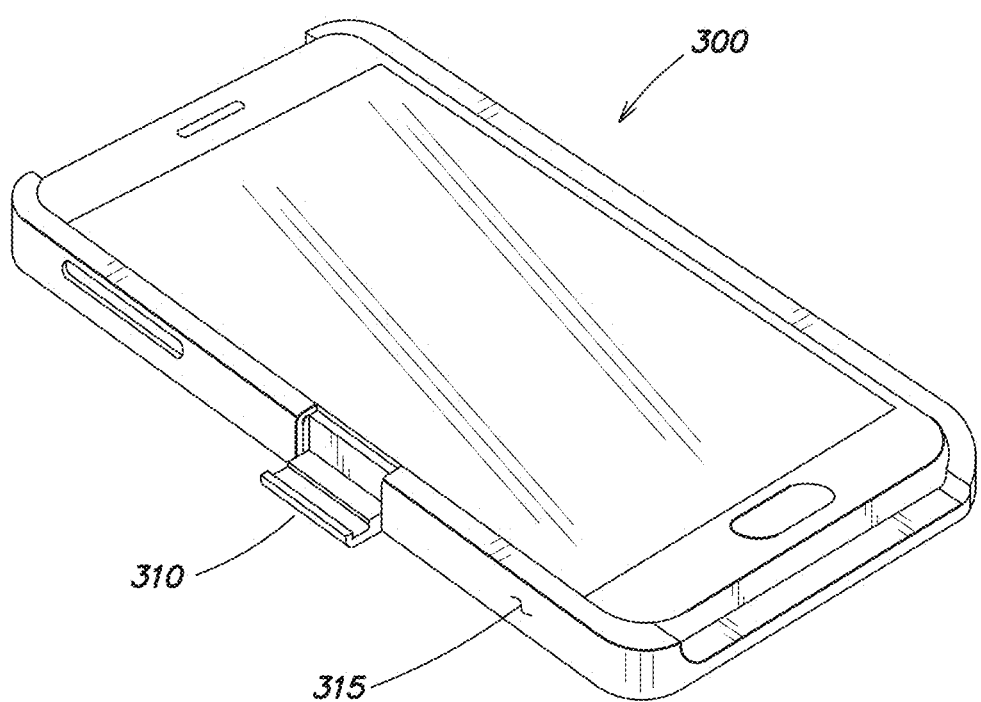
FIG. 9A illustrates another embodiment of a cell phone case fitted with a pair of tiles including dry adhesive microwedge arrays and a retainer/lever piece in an open position.
Figure 9B:
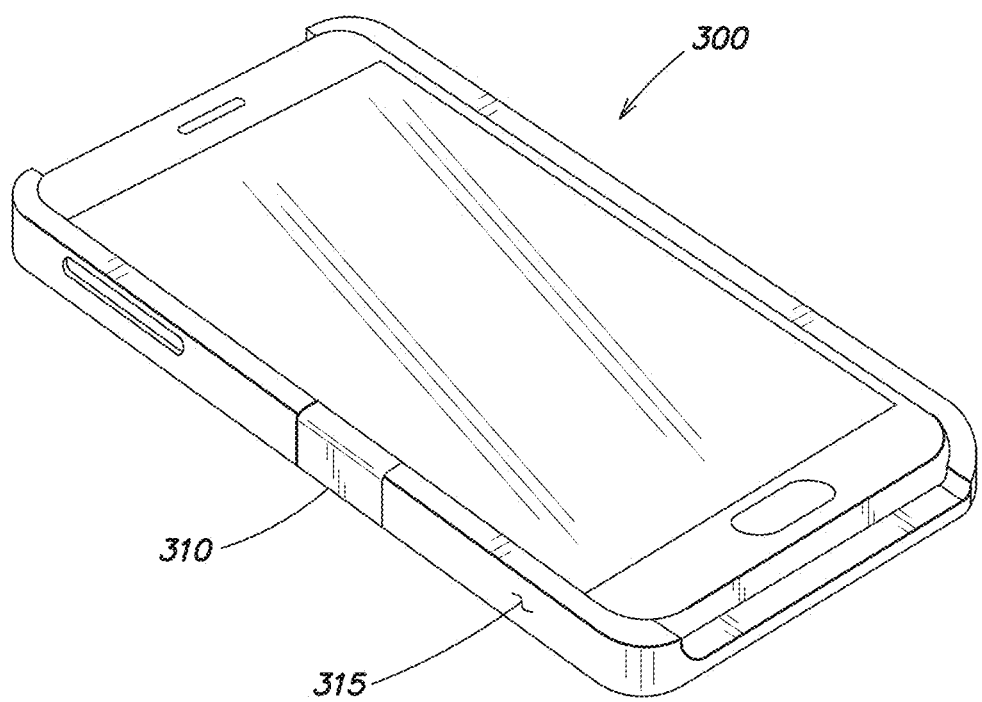
FIG. 9B is a view of the cell phone case of FIG. 9A with the retainer/lever piece in a closed position.
Figure 9C:
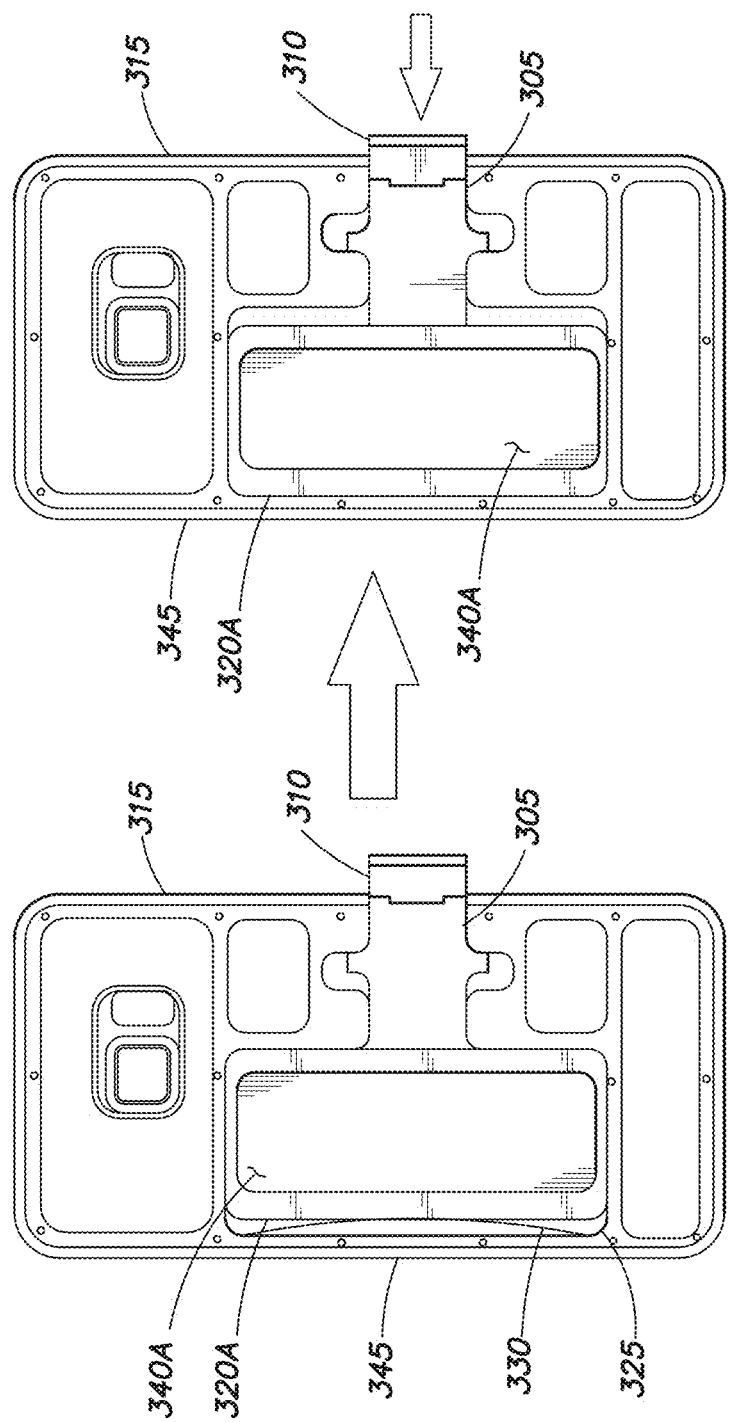
FIG. 9C illustrates an inner mechanism of the cell phone case of FIG. 9A.
Figure 9D:
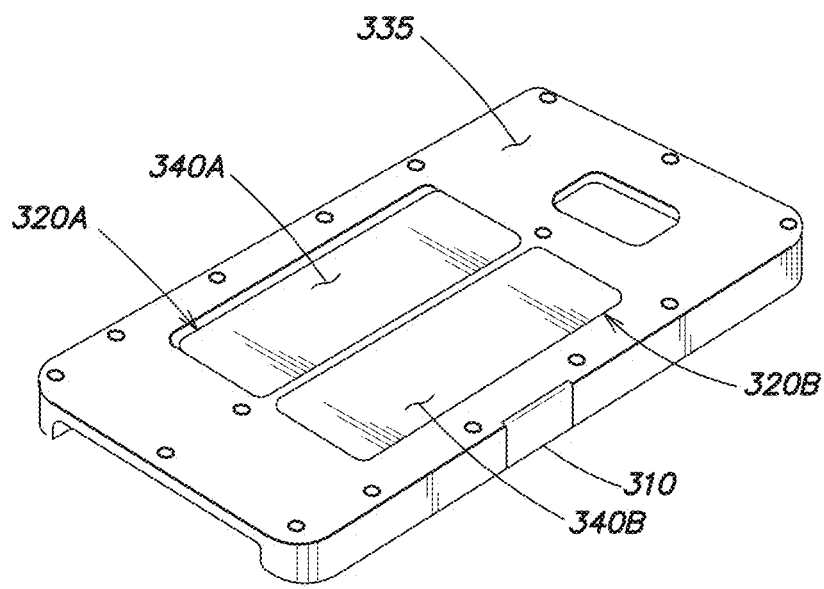
FIG. 9D illustrates the of the cell phone case of FIG. 9A with a rear cover attached.

Another embodiment is illustrated generally at 300 in FIGS. 9A-9E. The cell phone case 300 includes an actuator 305 with an end portion 310 that folds up against a side 315 of the cell phone case and clicks in place when not in use, as illustrated in FIGS. 9A and 9B. As illustrated in FIG. 9C, the actuator 305 terminates on a moveable microwedge adhesive tile 320A slidably disposed in a cavity 325 of the phone case 300. The moveable microwedge adhesive tile 320A includes an array of microwedges that are either untilted, or that are tilted in a direction away from the actuator 305 and toward the leaf spring 330 on the opposite side of the tile 320A from the actuator 305. The phone case 300 also includes an outer cover 335 (FIG. 9D) on which is mounted a fixed microwedge adhesive tile 320B. The face 340B of the fixed microwedge adhesive tile 320B upon which the microwedge array is formed is co-planar with the face 340A of the moveable microwedge adhesive tile 320B upon which the microwedge array is formed. The microwedges in the array of microwedges on the fixed tile 320B are either untilted, or are tilted in a direction opposite the tilt direction of the microwedges on the movable tile 320A. The outer cover 335 may cover edge portions of the movable tile 320A to retain it within the cavity 325.

Figure 9E:
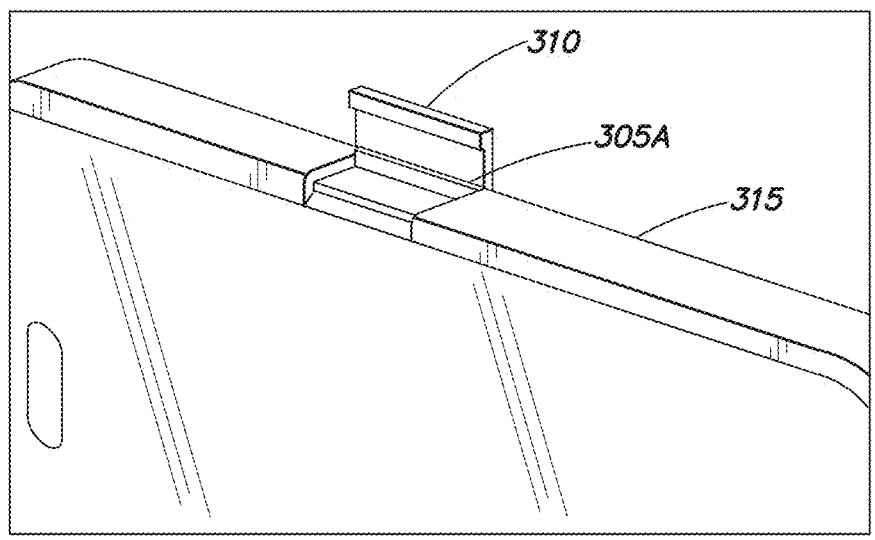
FIG. 9E is an enlarged view of a portion of the cell phone case of FIG. 9A.
Figure 10A:
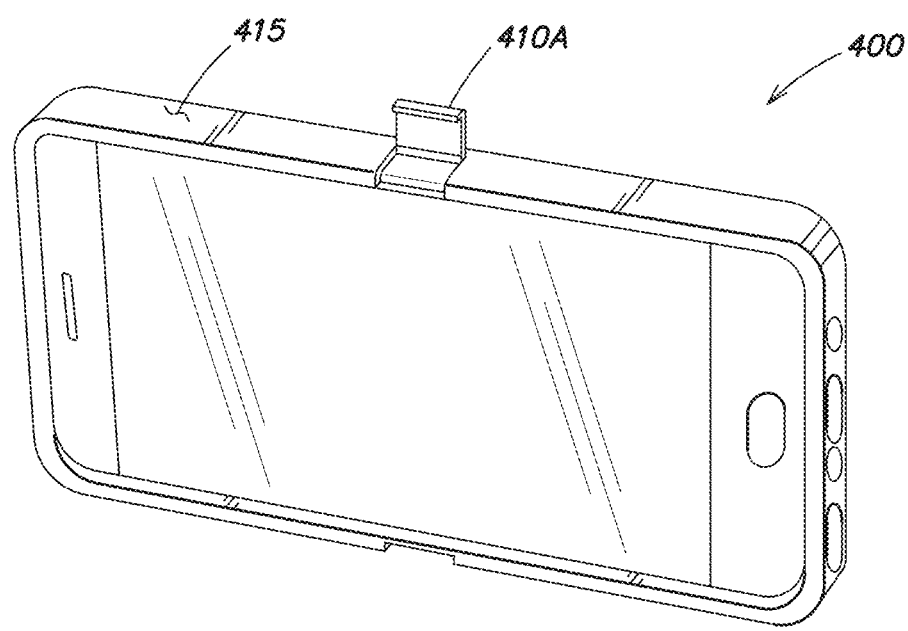
FIG. 10A illustrates another embodiment of a cell phone case fitted with a pair of tiles including dry adhesive microwedge arrays.
Figure 10B:
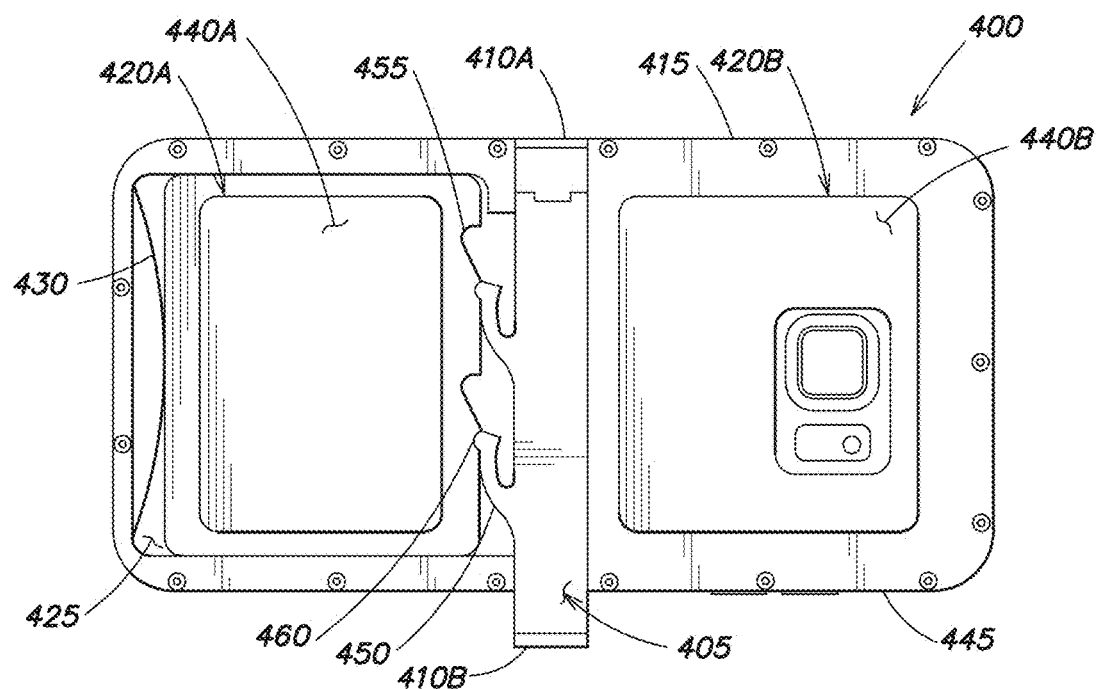
FIG. 10B illustrates an inner mechanism of the cell phone case of FIG. 10A.
Figure 10C:
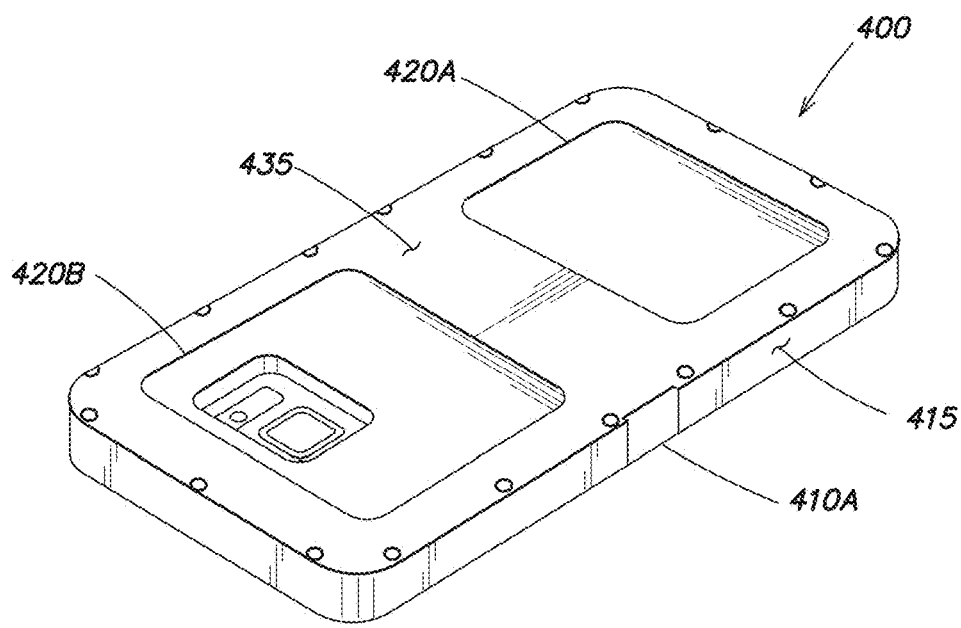
FIG. 10C illustrates the cell phone case of FIG. 10A with a rear cover attached.
Figure 10D:
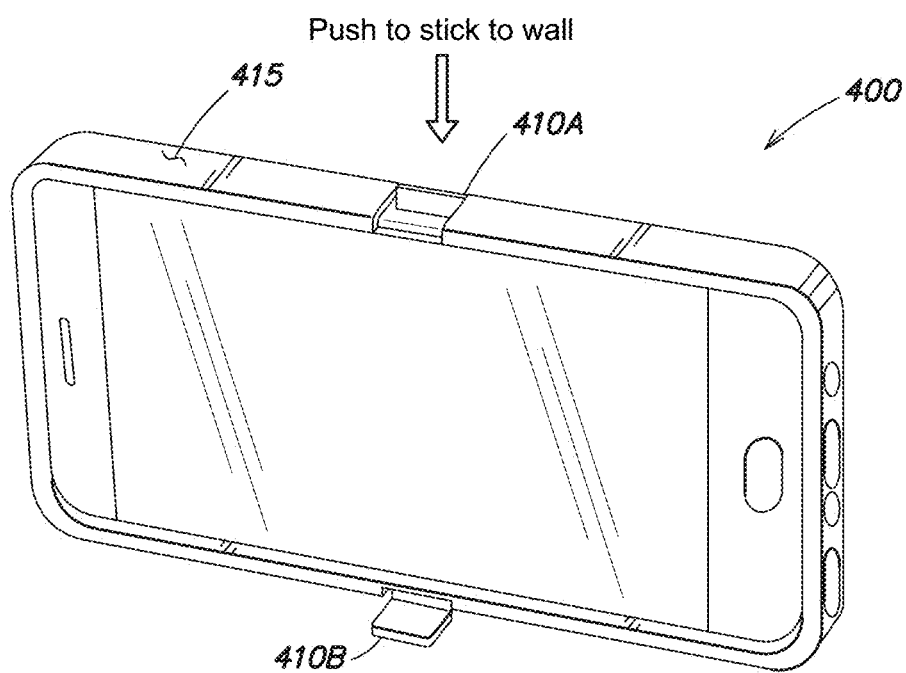
FIG. 10D is an alternate view of the cell phone case of FIG. 10A.
Figure 10E:
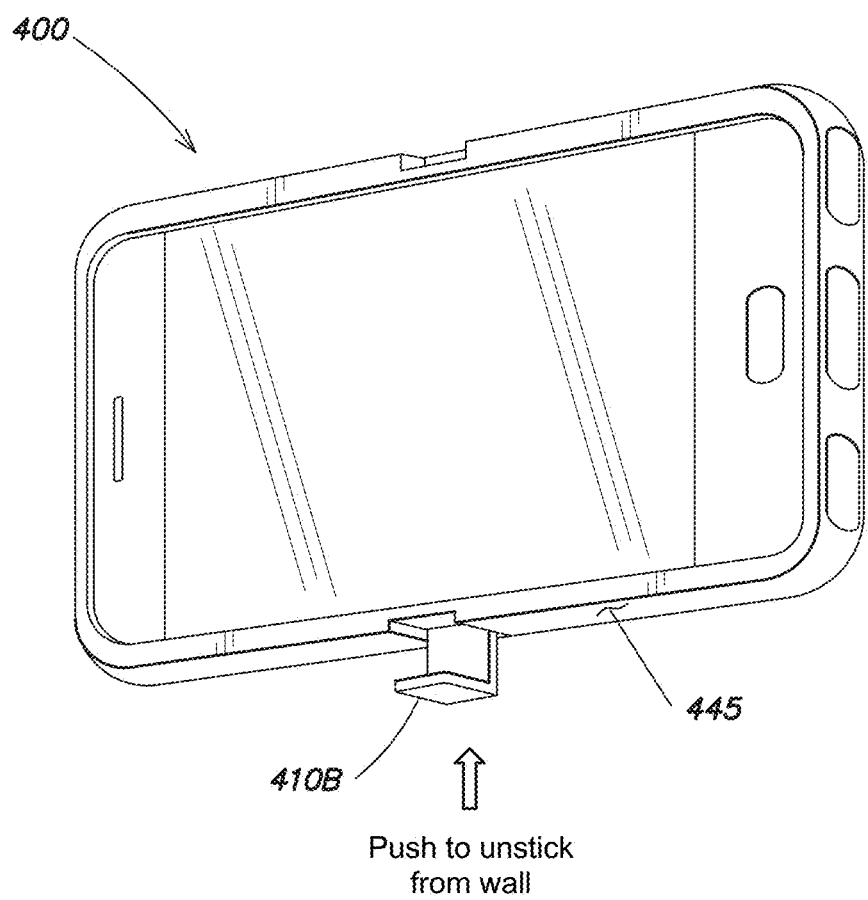
FIG. 10E is an alternate view of the cell phone case of FIG. 10A.

To adhere the phone case 300 to a surface, a user folds the end portion 310 of the actuator 305 away from the side 315 of the phone case (FIG. 9C) and presses the actuator 305 into the body of the phone case. Pressing on the actuator 305 causes the tile 320A to move toward the side 345 of the phone case opposite to that of the actuator 305 and to compress the leaf spring 330. The user then places the faces 340A, 340B of the tiles 320A, 320B onto a surface to which the user wishes to adhere the phone case 300 and releases the actuator 305. The leaf spring 330 pushes the tile 320A toward the interior of the body of the phone case 300 away from the side 345 of the phone case 300, causing the microwedges in the array of microwedges on the tile 320A to deform, for example, as illustrated in FIG. 6A or 6B. Deformation of the microwedges in the array of microwedges on the tile 320A increases the contact area between the leading edges of the microwedges on the tile 320A and the surface that the tile 320A is placed against, causing the microwedges to adhere to the surface to which they are applied. Friction caused by adhesion of the microwedges on the face of the tile 320A to the surface to which they are applied, along with continued force applied to the tile 320A by the leaf spring 330 may cause the body on the phone case 300 as a whole to be displaced in a direction opposite the tilt direction of the microwedges in the microwedge array on the fixed tile 320B, causing the microwedges on the face of the fixed tile 320B to be displaced in a direction opposite to their tilt direction such that they also deform as illustrated in FIG. 6A or 6B and adhere to the surface to which they are applied. The user may then release the phone case 300 and the phone case remains adhered to the surface by the adhesion forces supplied by the microwedges in tiles 320A and 320B. In some embodiments, the end portion 310 of the actuator 305 includes a marking 305A (FIG. 9E). If after attempting to adhere the phone case 300 to a surface, the end portion 310 of the actuator 305 extends outward from the body of the phone case 300 such that the marking 305A is visible, this is an indication that the microwedges in the tiles 320A and 320B may not have adhered properly to the surface.

The phone case 300 may be removed from the surface by pressing the actuator 305 into the body of the cell phone case 300 to cause the tiles 320A, 320B to move in the tilt direction of their respective microwedges, causing the deformation of the microwedges to be undone and the adhesion forces generated by the microwedges to be canceled. Alternatively the user may pull the phone case 300 from the wall with a force that exceeds the adhesion force produced by the microwedges on the faces of the tiles 320A, 320B.

Another embodiment of a cell phone case, indicated generally at 400 in FIGS. 10A-10E includes a two position adhesion mechanism. As in the cell phone case 300, the cell phone case 400 includes an actuator 405 with an end portion 410A that folds against a side 415 of the phone case when not in use and is flipped up when a user desires to adhere the phone case 400 to a surface. The end portion 410A includes a marking, for example, a red colored area that indicates that the phone case 400 is in an unadhered state. The phone case 400 includes a moveable microwedge adhesive tile 420A slidably disposed in a cavity 425 of the phone case 400 and a fixed microwedge adhesive tile 420B adhered to the cell phone case 400. Faces 440A, 440B of the tiles 420A, 420B including arrays of microwedges are co-planar. The microwedges in the face 440A of the movable tile 420A are either untilted or tilted away from the actuator 405 and toward a biasing element, for example, a leaf spring 430 disposed on the other side of the tile 420A from the actuator 405 in the cavity 425. The microwedges in the face 440B of the fixed tile 420B are either untilted or tilted toward the actuator 405 and the movable tile 420A in a direction opposite to the direction of tilt of the microwedges in the face 440A of the movable tile 420A.

The actuator 405 has one or more flexures 450 extending from a side of the actuator 405 facing the movable tile 420A within the body of the phone case 400. The phone case 400 includes a rear cover 435 that may have portions overlapping edges of the movable tile 420A and the actuator 405, retaining the movable time 420A and actuator within the body of the phone case 400.

When a user wishes to adhere the phone case 400 to a surface, the user flips open the end portion 410A of the actuator 405 and pushes the actuator 405 into the body of the phone case 400. The movement of the actuator 405 into the body of the phone case 400 causes the one or more flexures 450 to be displaced out of first recesses 455 and to push the movable tile 420A away from the actuator 405 and toward the leaf spring 430, in the direction of tilt of the microwedges in the face 440A of the movable tile 420A. The user may continue to press on the end portion 410A of the actuator 405 until the one or more flexures 450 click into the second recesses 460, providing a tactile or audible indication that the actuator 405 has been moved a sufficient distance such that the microwedges in the tiles 420A, 420B will adhere to the surface. A second end portion 410B of the actuator extends outward from the second side 445 of the phone case, providing a further indication that the actuator 405 has been displaced into a position that has moved the tiles 410A, 410B sufficiently such that their respective microwedge arrays should adhere to the surface to which they are applied. The second end portion 410B may be differently colored from the first end portion 410A to differentiate the two. For example, the first end portion 410A may be colored red and the second end portion 410B may be colored green.

The user then releases pressure on the end portion 410A of the actuator 405 which allows the leaf spring 430 to push the tile 420A back toward a central portion of the phone case 400 and to return the flexures 450 a short distance back up the "ramps" defining the second recesses 460 on the moving tile 420A. The microwedges in the face 440A of the movable tile 420A deform, for example, as illustrated in FIG. 6A or 6B. Deformation of the microwedges in the array of microwedges on the tile 420A increases the contact area between the leading edges of the microwedges on the tile 420A and the surface that the tile 420A is placed against, causing the microwedges to adhere to the surface to which they are applied. Friction caused by adhesion of the microwedges on the face of the tile 420A to the surface to which they are applied, along with continued force applied to the tile 420A by actuator 405 may cause the body on the phone case 400 as a whole to be displaced in a direction opposite the tilt direction of the microwedges in the microwedge array on the fixed tile 420B, causing the microwedges on the face of the fixed tile 420B to be displaced in a direction opposite to their tilt direction such that they also deform as illustrated in FIG. 6A or 6B and adhere to the surface to which they are applied.

To remove the phone case 400 from a surface to which it is adhered, a user may again press on the first end portion 410A of the actuator to move it into the body of the phone case, causing the flexures 450 to be displaced further into the second recesses 460 and causing the microwedges to move in their direction of tilt and de-adhere from the surface. The user may push on the second end portion 410B of the actuator 405 until the first end portion 410A of the actuator 405 extends outward from the body of the phone case 400 and may be flipped back in to a closed position against the side 415 of the phone case 400.

Figure 11B:
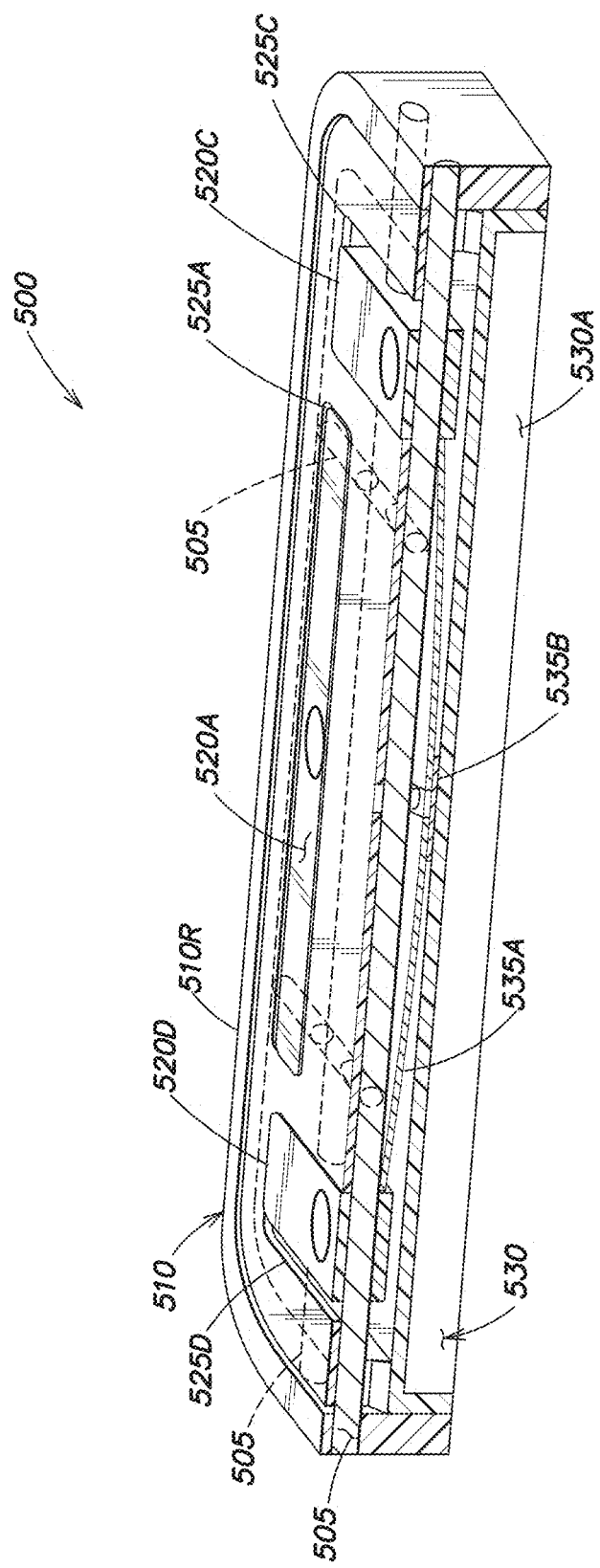
FIG. 11B is a cross-sectional isometric view the cell phone case of FIG. 11A along line 11B-11B.
Figure 11C:
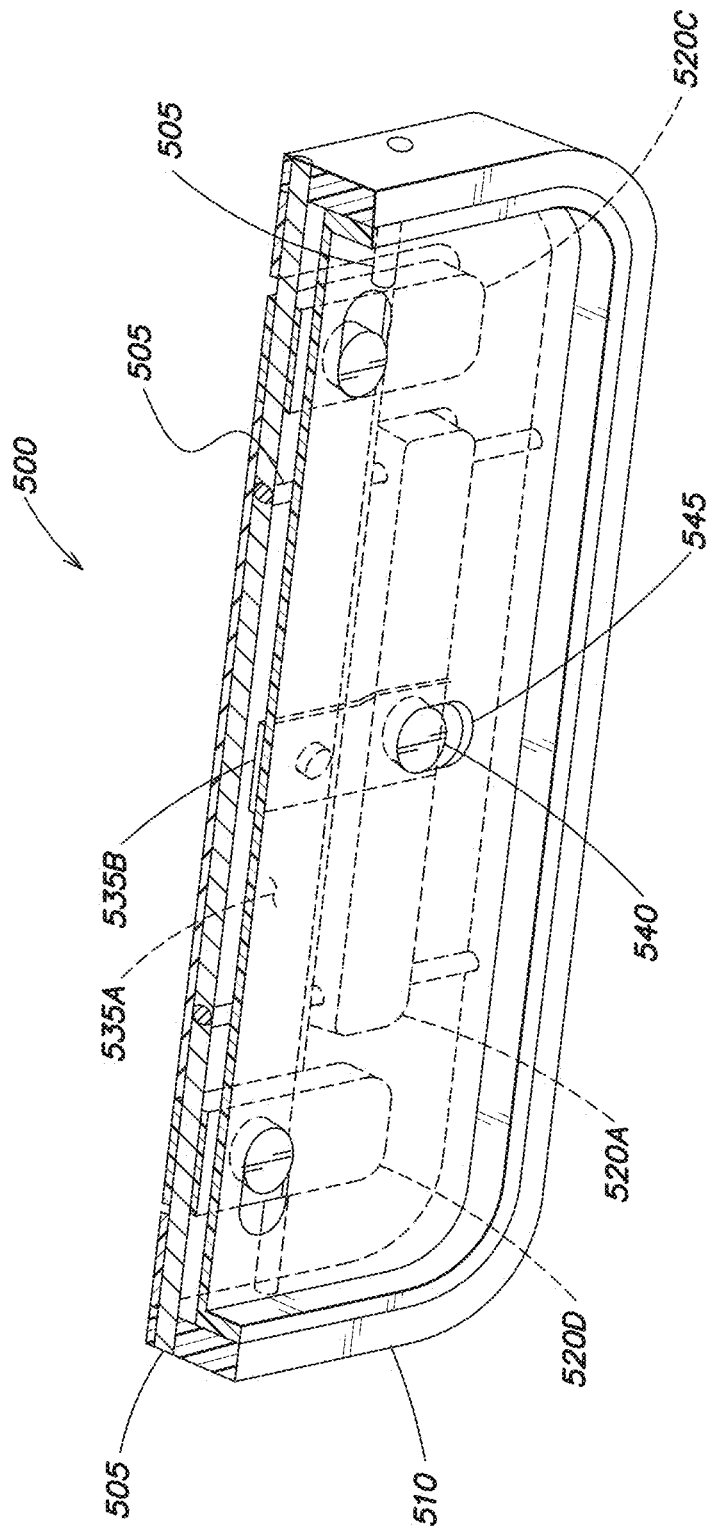
FIG. 11C is a cross-sectional isometric view of a portion of the cell phone case of FIG. 11A.

Another embodiment of a cell phone case is indicated generally at 500 in FIGS. 11A-11C. The phone case 500 includes rods 505 anchored to a frame 510. Tiles 520A, 520B, 520C, and 520D including dry adhesive microwedge arrays on faces thereof are mounted on the rods 505 and are free to slide along the rods 505 though respective cavities 525A, 525B, 525C, and 525D. The tiles may include guide posts 540 that move through respective apertures 545. The faces of the tiles 520A, 520B, 520C, and 520D are co-planar. Tiles 520A and 520B move in opposite directions along the rods upon which they are mounted and tiles 520C and 520D move in opposite directions along the rods upon which they are mounted. Tiles 520A and 520B may move along a direction perpendicular to a movement direction of tiles 520C and 520D. The tilt direction of the microwedges on the faces of the tiles 520A, 520B, 520C, and 520D is toward the frame 510 away from a center of the phone case 500 in a direction that the respective tiles move when moving along the rods 505 toward the frame 510. In other embodiments, the microwedges may be untilted. A cell phone 530 mounted in the phone case 500 is free to move in a direction perpendicular to a plane defined by the faces of the tiles 520A, 520B, 520C, and 520D. Actuators, for example, leaf springs 535A and 535B provide a force pulling the respective tiles toward one another and biasing the phone 530 toward a front of the case 500.

To mount the phone case to a surface, a user holds the phone case 500 by the frame 510 and presses on the face 530A of the phone 530. The phone 530 moves toward a rear of the frame 510R and presses on the leaf springs 535A and 535B. The leaf springs 535A and 535B in turn flatten and displace the tiles 520A, 520B, 520C, and 520D through the cavities 525A, 525B, 525C, and 525D in an outward direction toward the frame 510. The user then applies the faces of the tiles 520A, 520B, 520C, and 520D to a surface to which the user desires to adhere the phone case 500 and releases the pressure on the frame 510 while holding the face 530A of the phone 530 against the surface. The leaf springs 535A and 535B return toward their original configuration and pull the tiles 520A, 520B, 520C, and 520D through the cavities 525A, 525B, 525C, and 525D in an inward direction, causing the microwedges to deform as illustrated in FIG. 6A or 6B and adhere to the surface to which they are applied. To remove the phone case 500 from the surface, the user again presses on the frame 510 to displace the tiles 520A, 520B, 520C, and 520D through the cavities 525A, 525B, 525C, and 525D in an outward direction toward the frame 510 and causing the microwedge arrays on the faces of the tiles 520A, 520B, 520C, and 520D to de-adhere from the surface.

Figure 12A:
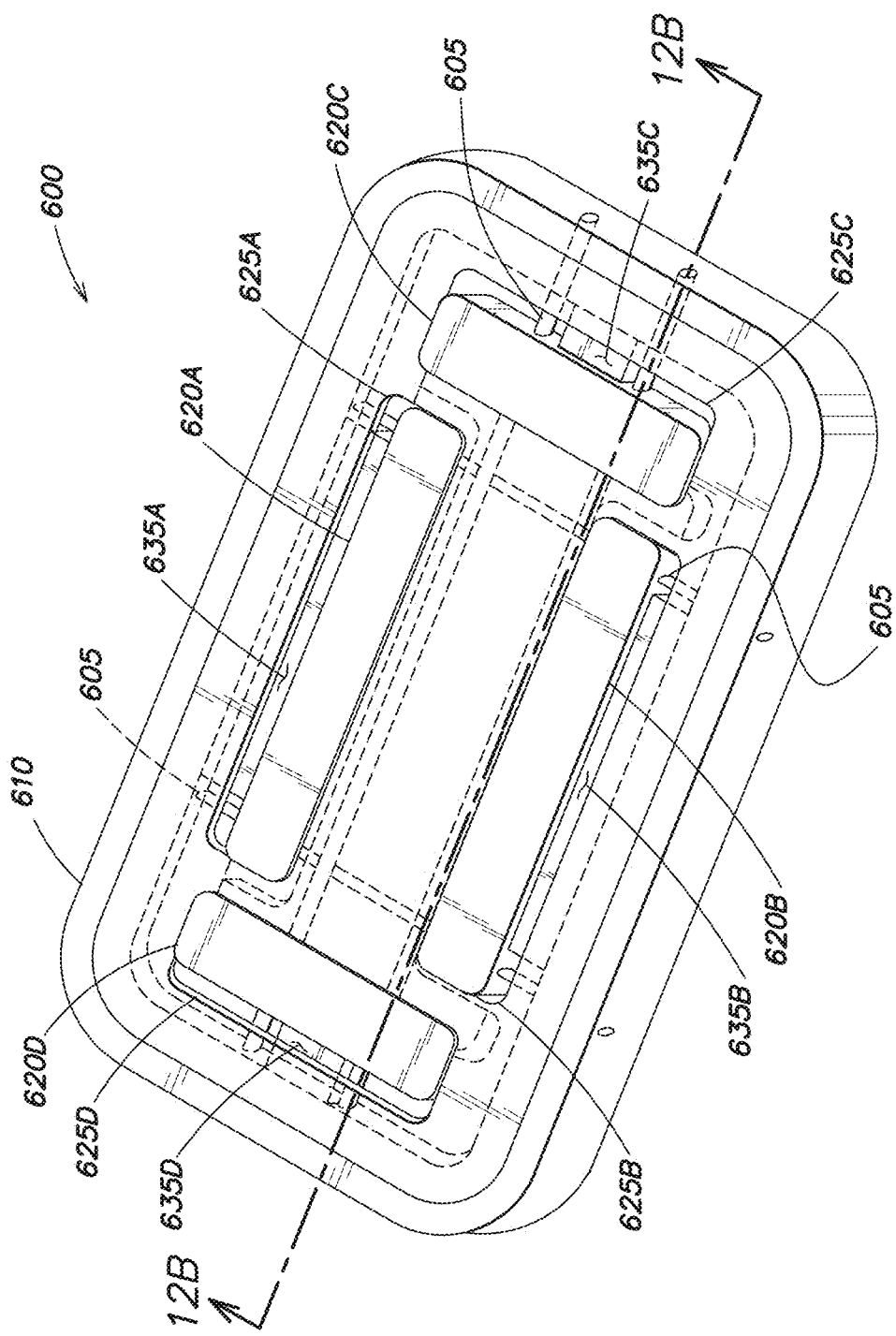
FIG. 12A illustrates an inner mechanism of another embodiment of a cell phone case fitted with tiles including dry adhesive microwedge arrays.
Figure 12B:
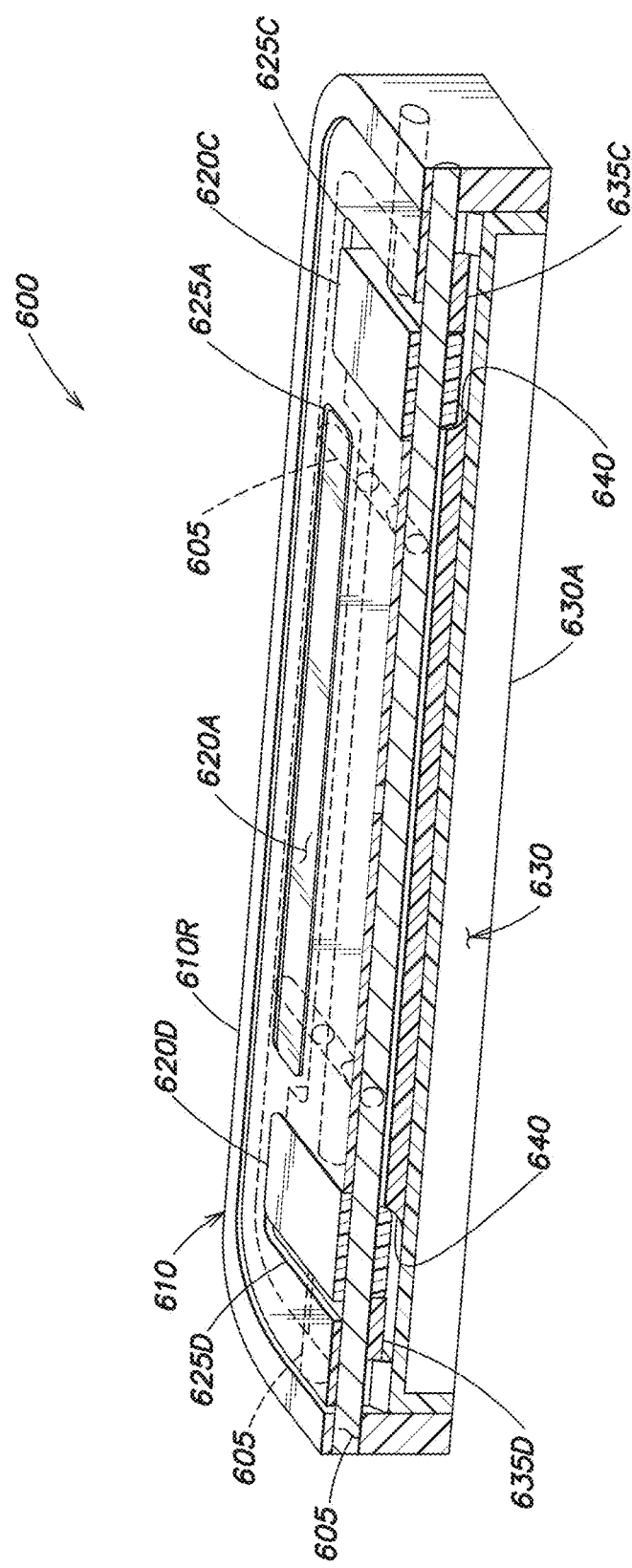
FIG. 12B is a cross-sectional side view the cell phone case of FIG. 12A along line 12B-12-B.
Figure 12C:
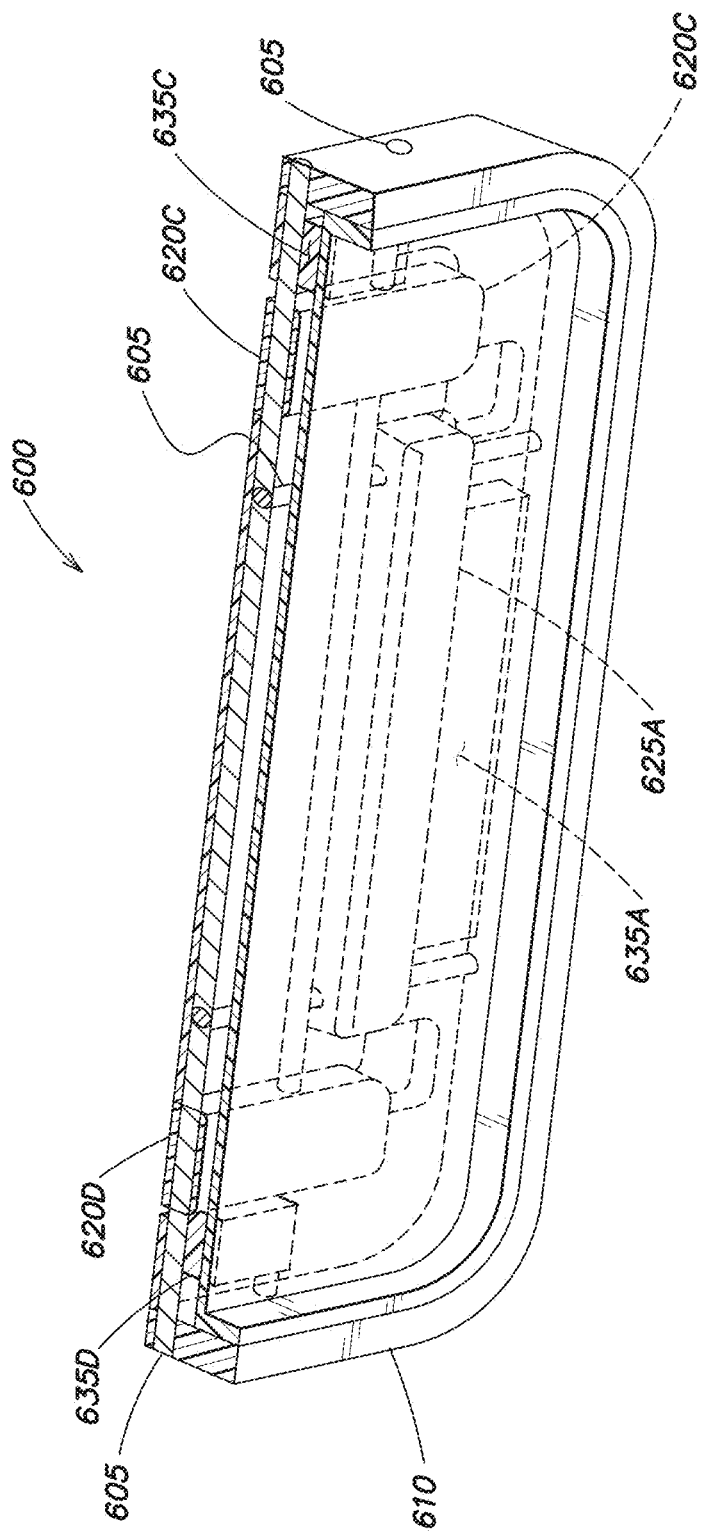
FIG. 12C is a cross-sectional isometric view of a portion of the cell phone case of FIG. 12A.

In another embodiment, indicated generally at 600 in FIGS. 12A-12C, a phone case 600 uses elastomer springs as biasing elements instead of leaf springs as described with reference to phone case 500 illustrated in FIGS. 11A-11C, although any form of compression spring, for example, helical compression springs, leaf springs, etc. may be utilized in this embodiment. The phone case 600 includes rods 605 anchored to a frame 610. Tiles 620A, 620B, 620C, and 620D including dry adhesive microwedge arrays on faces thereof are mounted on the rods 605 and are free to slide along the rods 605 though respective cavities 625A, 625B, 625C, and 625D. The faces of the tiles 620A, 620B, 620C, and 620D are co-planar. Tiles 620A and 620B move in opposite directions along the rods upon which they are mounted and tiles 620C and 620D move in opposite directions along the rods upon which they are mounted. Tiles 620A and 620B may move along a direction perpendicular to a movement direction of tiles 620C and 620D. The tilt direction of the microwedges on the faces of the tiles 620A, 620B, 620C, and 620D is toward the frame 610 away from a center of the phone case 600 in a direction that the respective tiles move when moving along the rods 605 toward the frame 610. In other embodiments, the microwedges may be untilted. A cell phone 630 mounted in the phone case 600 is free to move in a direction perpendicular to a plane defined by the faces of the tiles 620A, 620B, 620C, and 620D. Biasing elements, for example, elastomer bumper springs 635A, 635B, 635C, and 635D exert a force pushing the respective tiles toward one another and biasing the cell phone 630 toward a front of the case 600.

To mount the phone case to a surface, a user holds the phone case 600 by the frame 610 and presses on the face 630A of the cell phone 630. The phone 630 moves toward a rear of the frame 610R. The tiles 620A, 620B, 620C, and 620D are forced down incline plane structures 640 against the respective elastic bumper springs 635A, 635B, 635C, and 635D and through the cavities 625A, 625B, 625C, and 625D in an outward direction toward the frame 610. The user then applies the faces of the tiles 620A, 620B, 620C, and 620D to a surface to which the user desires to adhere the phone case 600 and releases the pressure on the frame 610 while holding the face 630A of the cell phone 630 against the surface. The elastic bumper springs 635A, 635B, 635C, and 635D push the tiles 620A, 620B, 620C, and 620D through the cavities 625A, 625B, 625C, and 625D in an inward direction, causing the microwedges to deform as illustrated in FIG. 6A or 6B and adhere to the surface to which they are applied. To remove the phone case 600 from the surface, the user again presses on the frame 610 to displace the tiles 620A, 620B, 620C, and 620D through the cavities 625A, 625B, 625C, and 625D in an outward direction toward the frame 610 and causing the microwedge arrays on the faces of the tiles 620A, 620B, 620C, and 620D to de-adhere from the surface.

Figure 13A:
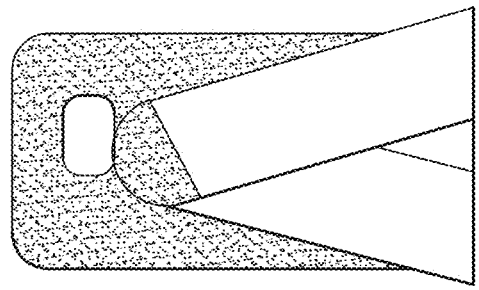
FIGS. 13A-13F illustrate alternate configurations of mechanisms including dry adhesive microwedge arrays for adhering an object to a surface.
Figure 13B:
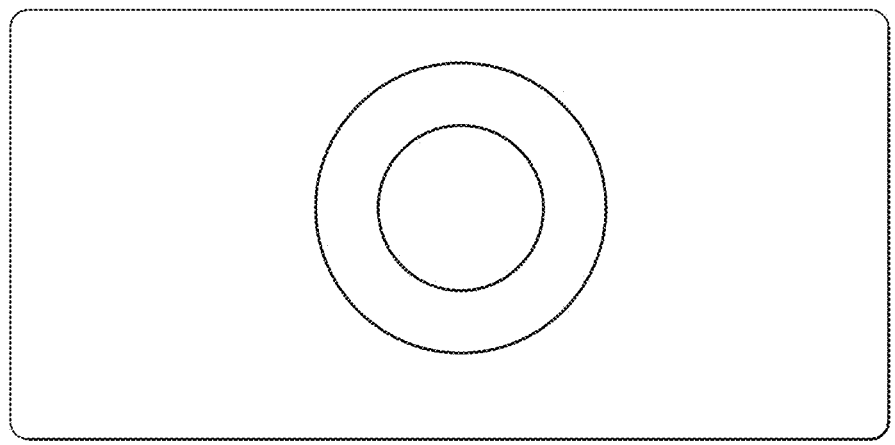
Figure 13C:
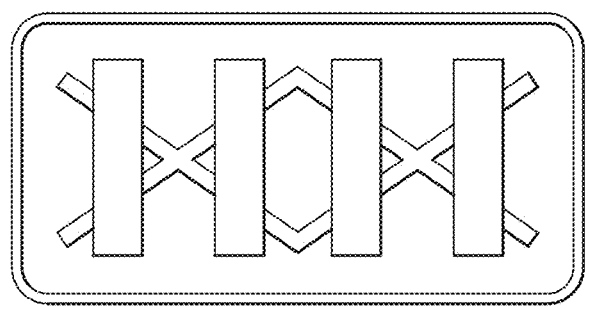
Figure 13D:
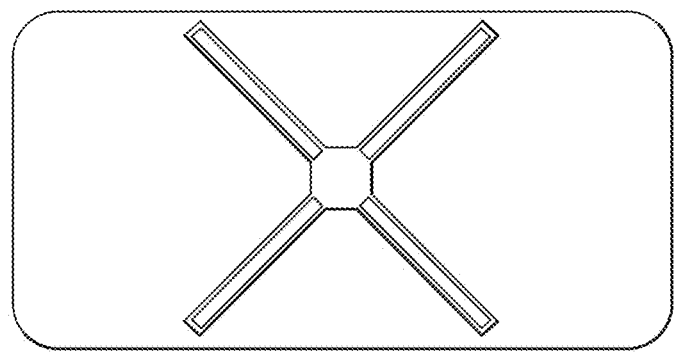
Figure 13E:
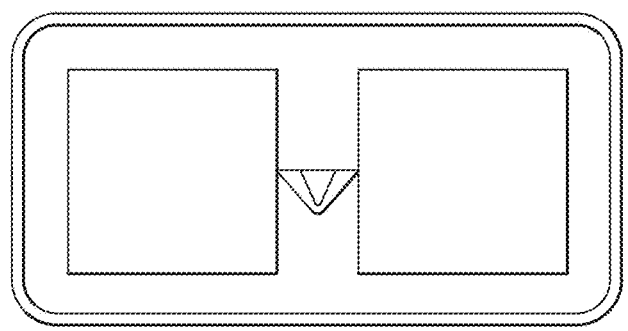
Figure 13F:
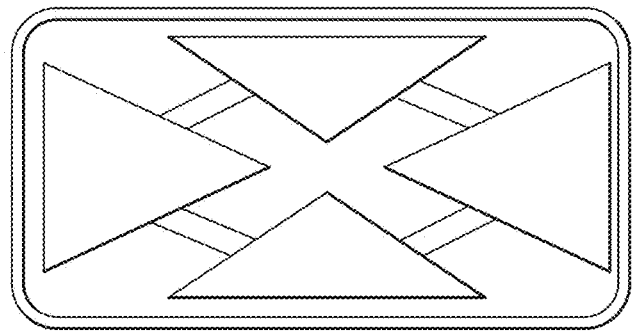

Numerous alternate configurations for dry adhesive microwedge array bearing structures may be utilized in a phone case or other apparatus for securing an object to a surface. These alternate configurations include, for example, rotary mechanisms including counter-rotating tiles (FIG. 13A) or counter-rotating discs and rings (FIG. 13B) in which a torsion spring applies the shearing force used to adhere the microwedges to a surface. In these embodiments, one or both of the tiles, discs, or rings may be movable and one or more others of the tiles, discs, or rings may be fixed in place on the body to which they are attached. Other alternate configurations include multi-strip configurations (FIG. 13C) in which a number of strips or wedges are actuated at the same time by a linkage, creating an array of adhesive surfaces, self-shearing configurations (FIG. 13D) in which the application load (when the user pushes the case against the wall) is converted into shear tension, causing adhesion, tensing configurations (FIG. 13E) in which an elastic component is used to apply shear force to the tiles, or four-way configurations (FIG. 13F) in which a mechanism applies shear force to dry adhesive microwedge array bearing tiles in four directions using a linkage. In further embodiments, the tiles are co-radial arc segments, one or both of which being constrained to traverse the circumferential direction.

Figure 14A:
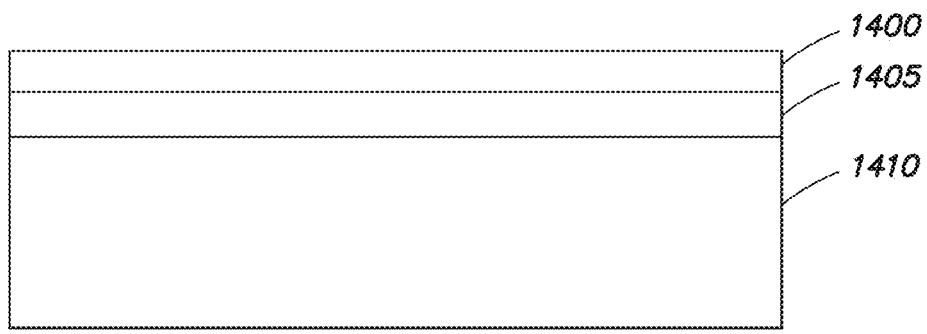
FIGS. 14A-14D illustrate alternate methods of attaching a film including a dry adhesive microwedge array to an object.

FIGS. 14A-14D illustrate various ways in which a dry adhesive microwedge array may be mounted to a tile on a cell phone holder or other object. As illustrated in FIG. 14A, a film 1400 upon which a microwedge array is formed, optionally with a fiber reinforced backing as described in co-owned international patent application No. PCT/US2015/064791, may be directly secured to a surface of an object 1410 that a user wishes to make adhereable to a surface via the microwedge array. The film 1400 may be secured to the object 1410 by a thin (0.001"–0.0025") layer of mutually compatible adhesive 1405, for example, silicone rubber adhesive. The configuration illustrated in FIG. 14A may provide excellent adhesion to a smooth surface because direct adhesion of the film 1400 to the rigid object 1410 may provide for equal force to be applied to the film 1400 through the object 1410 over a substantial or entire amount of surface area of the film 1400.

Figure 14B:

In another embodiment, illustrated in FIG. 14B, a thin (0.025"–0.10") layer of compliant material 1415 may be disposed between the film 1400 upon which the microwedge array is formed and the surface of the object 1410. The compliant material 1415 may include, for example, any of silicone foam, encapsulated hydrostatic gel, viscoelastic polyurethane foam, rubber, or other compliant materials known in the art. Thin (0.001"–0.0025") layers of mutually compatible adhesive 1405 may secure the film 1400 and compliant material layer 1415 to the surface of the object 1410. The embodiment illustrated in FIG. 14B may be useful for securing an object to a surface that has large scale surface imperfections. The compliant layer 1415 may deform to allow the film 1400 to conform to a surface including bumps or recesses. The compliant layer 1415 may also dampen vibrations produced by the object 1410 or emanating from the surface to which the object is adhered to reduce the chance of the vibrations knocking the object 1410 loose from the surface.

Figure 14C:
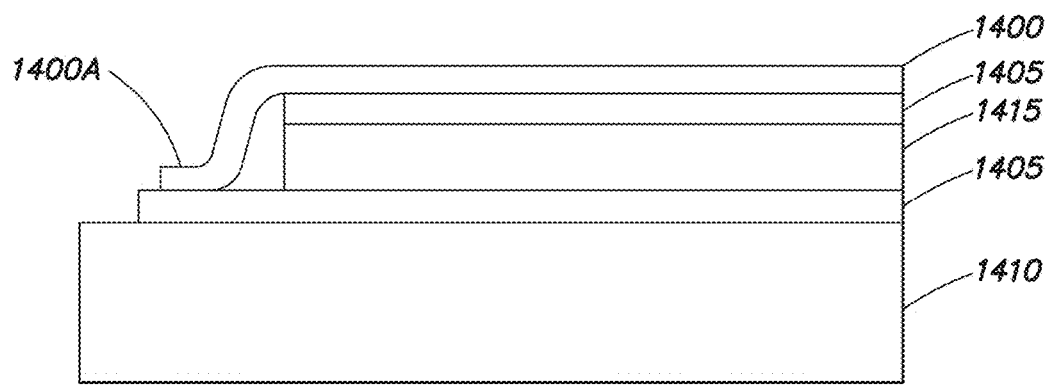

In some embodiments, at least a portion of a periphery of the film 1400 upon which the microwedge array is formed may extend beyond the periphery of a compliant material layer 1415 upon which it is mounted. As illustrated in FIG. 14C, a portion of the periphery 1400A of the film 1400 that extends beyond the periphery of the compliant material layer 1415 may be attached to the surface of the object 1410 via the adhesive 1405. This embodiment may be desirable when using a compliant material layer 1415 with limited capacity to carry shear loads. The attachment of the periphery 1400A of the film 1400 to the surface of the object 1410 may prevent the compliant layer beneath the film 1400 from shearing under an applied shear load such that the shear load is absorbed by the microwedge array on the film 1400 to cause the microwedges to properly deform and adhere to a surface to which they are applied.

Figure 14D:
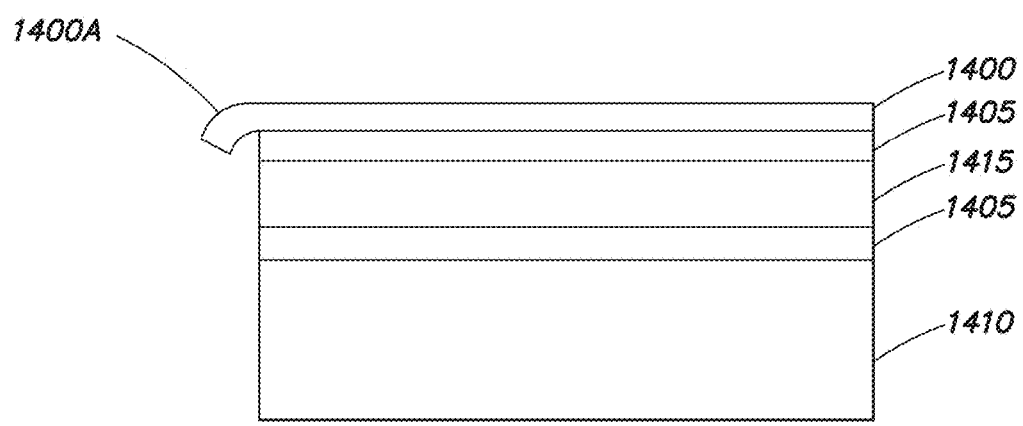

In a further embodiment, illustrated in FIG. 14D, the portion of the periphery 1400A of the film 1400 that extends beyond the periphery of the compliant material layer 1415 may be left freely overhanging beyond the periphery of the compliant material layer 1415. The overhanging portion of the periphery 1400A of the film 1400 may promote conformal contact to a surface at the boundary of the film layer 1400. This embodiment may be appropriate when the compliant layer 1415 has sufficient capacity to carry a desired amount of shear load.

Figure 15:
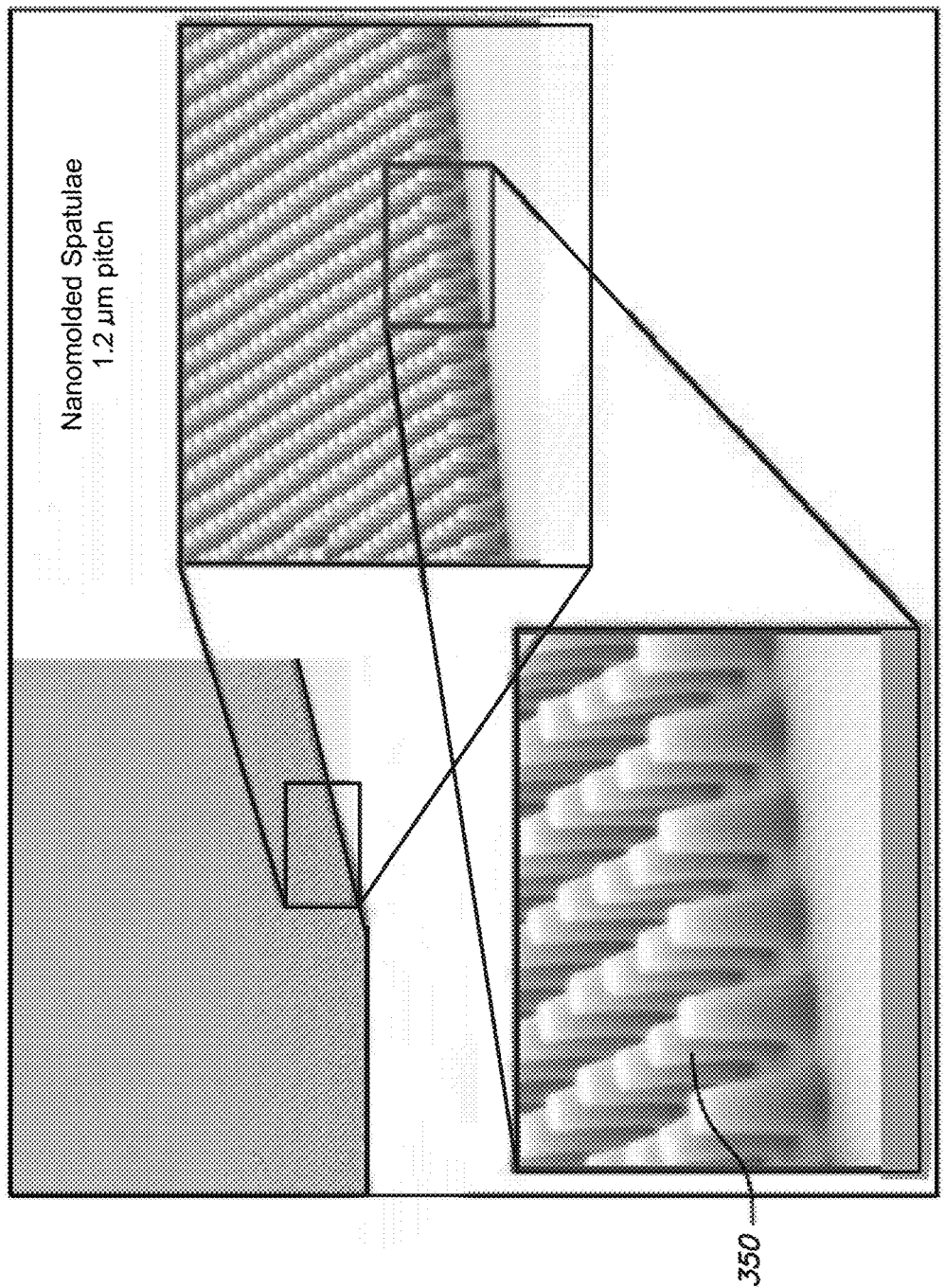
FIG. 15 is a micrograph of an embodiment of a micro-pillar array that may be utilized as micro-elements in embodiments of a micro-scale dry adhesive structure.
Figure 16:
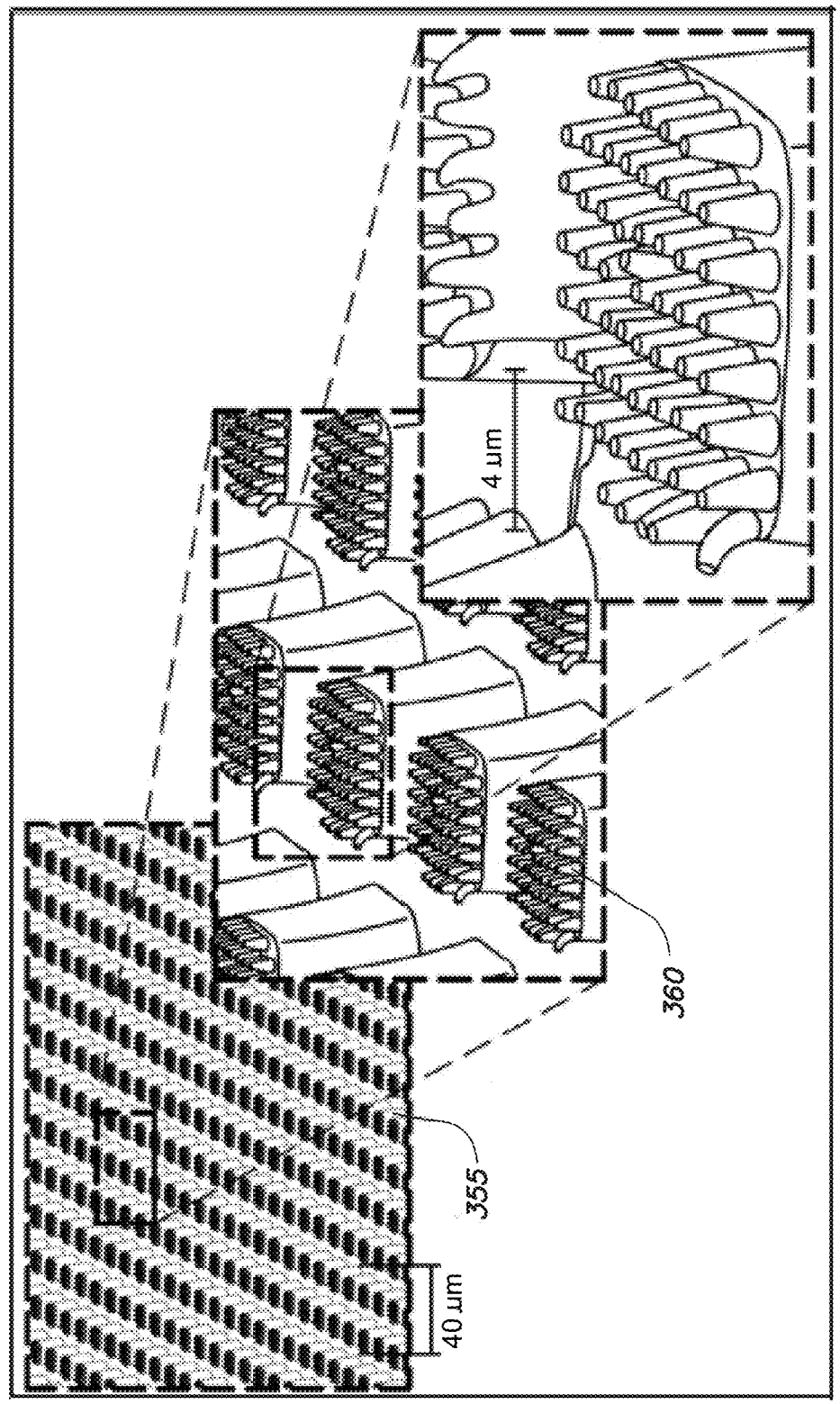
FIG. 16 a schematic illustration of an embodiment of a micro-tower array that may be utilized as micro-elements in embodiments of a micro-scale dry adhesive structure.
Figure 17:
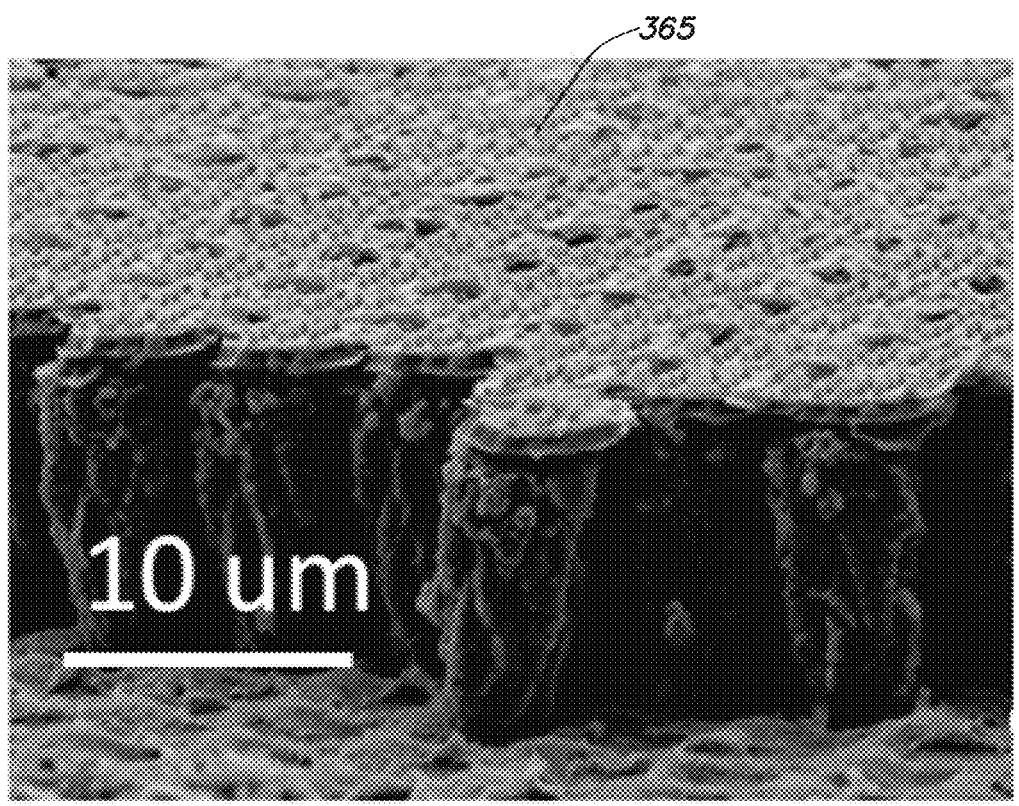
FIG. 17 is a micrograph of an embodiment of a micro-column array that may be utilized as micro-elements in embodiments of a micro-scale dry adhesive structure.
Figure 18:
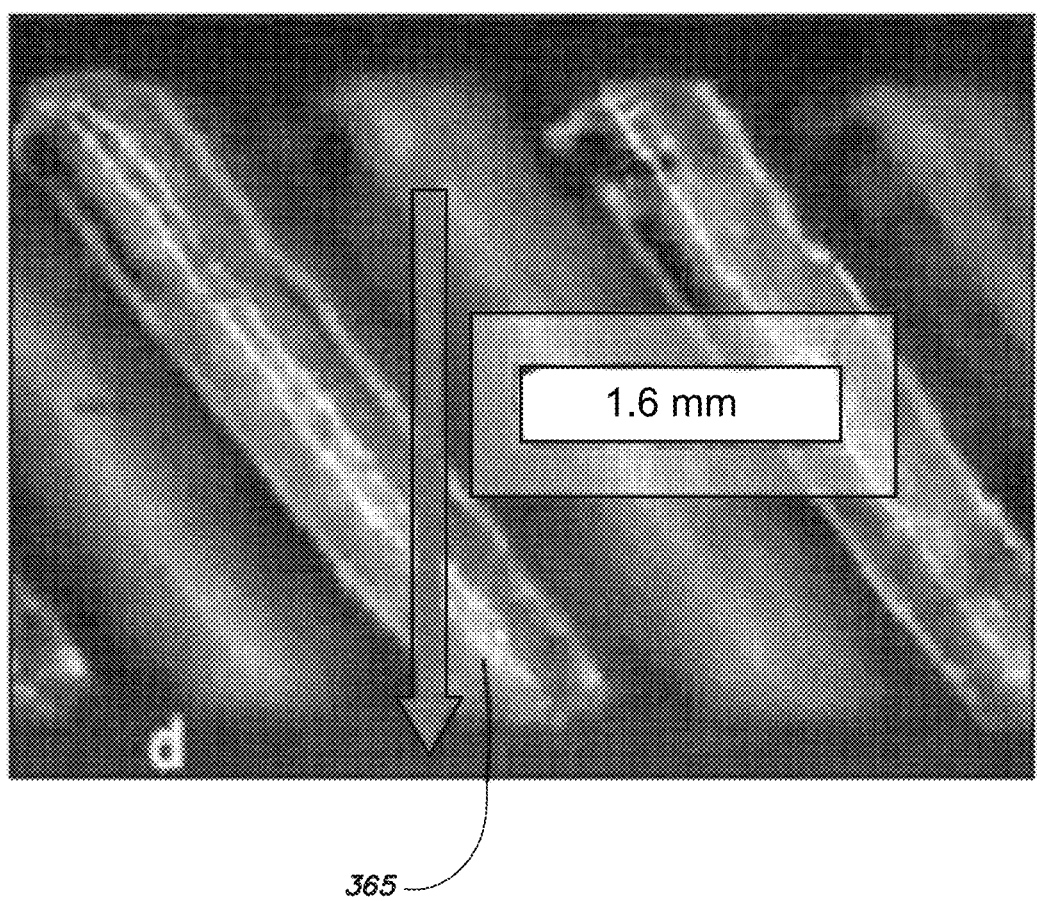
FIG. 18 is a micrograph of another embodiment of a micro-column array that may be utilized as micro-elements in embodiments of a micro-scale dry adhesive structure.

Although the micro-scale dry adhesive structures disclosed herein have been described with reference to microwedge adhesive structures, it should be appreciated that in various embodiments alternative or additional micro-element morphologies may be utilized in the embodiments of the micro-scale dry adhesive structures disclosed herein, for example, micro-pillars 350 (FIG. 15), micro-towers 355, optionally including micro-pillars 360 extending from upper surfaces (FIG. 16), or micro-columns 365 oriented substantially normal to a substrate (FIG. 17) or at an angle relative to a substrate (FIG. 18).

Example

Figure 19:
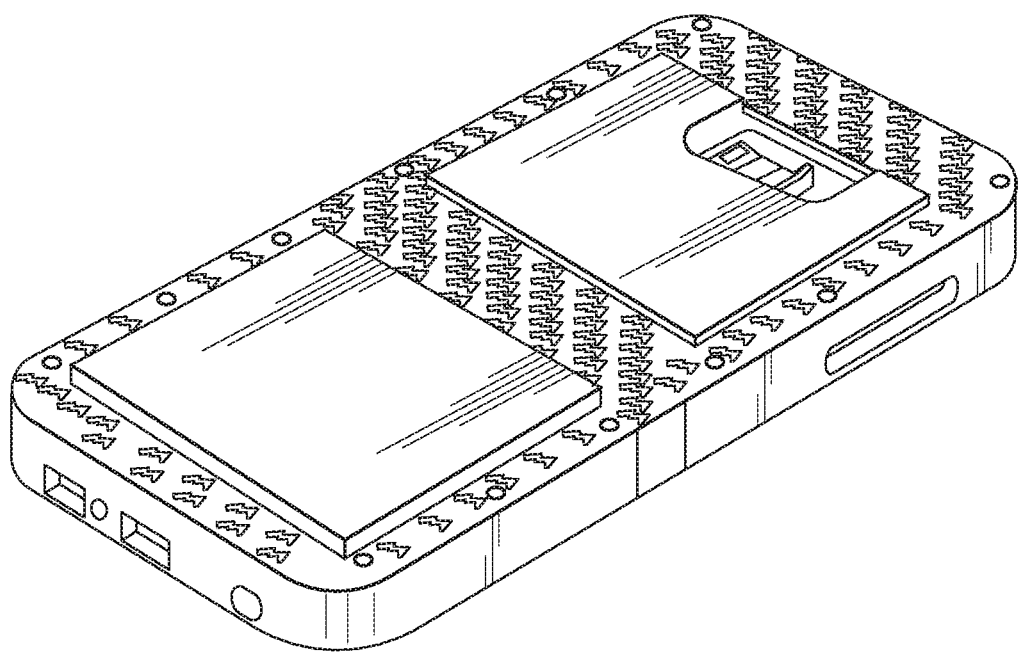
FIG. 19 illustrates a prototype cell phone case fitted with a pair of tiles including dry adhesive microwedge arrays.

A cell phone case including a pair of tiles having dry adhesive microwedge arrays was constructed. This cell phone case is illustrated in FIG. 19. The dimensions of the cell phone case were 146.6 by 75.2 by 13.8 millimeters and when a Samsung Galaxy S6 cell phone was mounted in the case, the case weighed approximately three ounces. The microwedge tiles had dimensions of approximately 50 mm×50 mm and included approximately 800 microwedges each. The microwedges were made of polydimethylsiloxane (PDMS) and had heights of approximately 100 μm, wedge to wedge centerline spacing of approximately 60 μm, and were angled relative to the surface of the tile at about 60°. The micro-wedges were mounted to Delrin tiles with a 1.60 mm cellular silicone foam compliant layer. The cell phone case had a tile displacement mechanism as described with reference to FIG. 8A.

In testing the cell phone case, the microwedge tiles were displaced utilizing the actuator and then the microwedge tiles were placed against on various surfaces including glass, lacquered wood, painted drywall, painted and bare metal, and plastic with a normal force of around 1-7 lbf and the actuator was released. The cell phone case adhered to the surfaces as was able to withstand a normal force away from the surface of about 1-7 lbf and a shear stress parallel to the surface of about 2-10 lbf without de-adhering from the surface.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A surface affixable device incorporating mechanically actuated dry adhesive, the device comprising:
   a body;
   a plurality of tiles affixed to the body, each of the plurality of tiles including an array of dry adhesive material elements disposed on front faces thereof, a first of the plurality of tiles being movably affixed to the body;
   an actuator constructed and arranged to displace the first of the plurality of tiles in a first direction relative to a second of the plurality of tiles; and
   a biasing element that, upon displacement of the first of the plurality of tiles in the first direction, applies a bias to the first of the plurality of tiles in a second direction, the second direction being opposite the first direction.

2. The device of claim 1, wherein the plurality of tiles are co-planar.

3. The device of claim 2, wherein the front faces of the plurality of tiles define a movement plane, the first direction being in the movement plane, and the second direction being in the movement plane.

4. The device of claim 2, wherein the actuator is co-planar with the plurality of tiles.

5. The device of claim 4, wherein the actuator is constructed and arranged to displace the first of the plurality of tiles out of a plane defined by the front faces of the plurality of tiles.

6. The device of claim 1, wherein the bias displaces the first of the plurality of tiles relative to the second of the plurality of tiles, displacement of the first of the plurality of tiles relative to the second of the plurality of tiles generating an adhesive force between the plurality of tiles and a surface in contact with the front faces of the plurality of tiles.

7. The device of claim 1, wherein each array of dry adhesive material elements includes mechanically actuated directional dry adhesive elements.

8. The device of claim 7, wherein the actuator is constructed and arranged to displace the first of the plurality of tiles in a tilt direction of the mechanically actuated directional dry adhesive elements.

9. The device of claim 1, wherein each array of dry adhesive material elements includes an array of microwedges.

10. The device of claim 1, wherein the actuator slides into and out of the body between the first of the plurality of tiles and the second of the plurality of tiles.

11. The device of claim 1, wherein the biasing element is a leaf spring.

12. The device of claim 1, wherein the biasing element includes an elastomeric material.

13. The device of claim 1, wherein each of the plurality of tiles further includes a rear face adhesively coupled to a base, the base being coupled to the body.

14. The device of claim 13, wherein the base includes a compliant material layer.

15. The device of claim 14, wherein the array of dry adhesive material elements of each of the plurality of tiles is defined in a sheet, at least a portion of a periphery of the sheet extending beyond a periphery of the compliant material layer.

16. The device of claim 15, wherein the sheet is adhesively coupled to the base at least partially about the periphery of the compliant material layer.

17. The device of claim 1, wherein the second of the plurality of tiles is fixed in place on the body.

18. The device of claim 1, wherein the body includes a recess configured to receive and retain a consumer electronic device.

19. A surface affixable device incorporating mechanically actuated dry adhesive, the device comprising:
   a body;
   a plurality of co-planar tiles affixed to the body, each of the plurality of co-planar tiles including an array of dry adhesive material elements disposed on faces thereof, the faces of the plurality of co-planar tiles defining a movement plane, a first of the plurality of co-planar tiles being movably affixed to the body, a second of the plurality of co-planar tiles being fixed in place on the body; and
   an actuator constructed and arranged to displace the first of the plurality of co-planar tiles in a first direction in the movement plane relative to the second of the plurality of co-planar tiles, displacement of the first of the plurality of co-planar tiles relative to the second of the plurality of co-planar tiles generating an adhesive force between the plurality of co-planar tiles and a surface in contact with the faces of the plurality of co-planar tiles.

20. A surface affixable device incorporating mechanically actuated dry adhesive, the device comprising:
   a body;
   a plurality of tiles affixed to the body, each of the plurality of tiles including an array of dry adhesive material elements disposed on faces thereof, a first of the plurality of tiles being movably affixed to the body; and
   a biasing element that, upon displacement of a first of the plurality of tiles in a first direction relative to a second of the plurality of tiles, applies a bias to the first of the plurality of tiles in a second direction, the second direction being opposite the first direction.

21. The device of claim 20, wherein the plurality of tiles is a plurality of co-planar tiles, and the first direction is a rotational direction in a plane defined by the faces of the plurality of co-planar tiles.

22. A surface affixable device incorporating mechanically actuated dry adhesive, the device comprising:
   a body;
   a plurality of tiles affixed to the body, each of the plurality of tiles including an array of dry adhesive material elements disposed on front faces thereof, at least one of the plurality of tiles being movably affixed to the body;
   an actuator constructed and arranged to apply a first force on the at least one of the plurality of tiles in a first direction relative to a second of the plurality of tiles; and
   a biasing element that, upon displacement of the at least one of the plurality of tiles in the first direction, applies a bias to the at least one of the plurality of tiles in a second direction, the second direction being opposite the first direction.

23. The device of claim 22, wherein the plurality of tiles are disposed in a common plane.

\* \* \* \* \*